(12) United States Patent
Boisvert et al.

(10) Patent No.: US 8,217,612 B2
(45) Date of Patent: *Jul. 10, 2012

(54) COLLISION MONITORING SYSTEM

(75) Inventors: Mario Boisvert, Reed City, MI (US); Randall Perrin, Grawn, MI (US); John Washeleski, Cadillac, MI (US)

(73) Assignee: Uusi, LLC, Reed City, MI (US)

( * ) Notice: Subject to any disclaimer, the term of this patent is extended or adjusted under 35 U.S.C. 154(b) by 405 days.

This patent is subject to a terminal disclaimer.

(21) Appl. No.: 12/360,942

(22) Filed: Jan. 28, 2009

(65) Prior Publication Data

US 2009/0272035 A1  Nov. 5, 2009

Related U.S. Application Data

(63) Continuation of application No. 10/100,892, filed on Mar. 18, 2002, now Pat. No. 7,548,037, which is a continuation-in-part of application No. 09/562,986, filed on May 1, 2000, now Pat. No. 6,404,158, which is a continuation-in-part of application No. 08/736,786, filed on Oct. 25, 1996, now Pat. No. 6,064,165, which is a continuation of application No. 08/275,107, filed on Jul. 14, 1994, now abandoned, which is a continuation-in-part of application No. 07/872,190, filed on Apr. 22, 1992, now Pat. No. 5,334,876.

(60) Provisional application No. 60/169,061, filed on Dec. 6, 1999.

(51) Int. Cl.
*G05D 3/00* (2006.01)

(52) U.S. Cl. ........ 318/466; 318/264; 318/265; 318/266; 318/280; 318/282; 318/286; 318/461; 318/468; 318/469

(58) Field of Classification Search ........................ None
See application file for complete search history.

(56) References Cited

U.S. PATENT DOCUMENTS

| | | | | |
|---|---|---|---|---|
| 4,328,540 A | * | 5/1982 | Matsuoka et al. | 700/56 |
| 4,344,252 A | * | 8/1982 | Suzuki et al. | 49/199 |
| 4,347,465 A | * | 8/1982 | Goertler et al. | 318/266 |
| 4,365,250 A | * | 12/1982 | Matsuoka et al. | 340/5.71 |
| 4,383,206 A | * | 5/1983 | Matsuoka et al. | 318/445 |
| 4,386,398 A | * | 5/1983 | Matsuoka et al. | 700/90 |
| 4,514,670 A | | 4/1985 | Fassel et al. | |
| 4,608,637 A | | 8/1986 | Okuyama et al. | |
| 4,641,067 A | | 2/1987 | Iizawa et al. | |
| 4,673,848 A | | 6/1987 | Hagiwara et al. | |
| 4,686,598 A | | 8/1987 | Herr | |
| 4,730,152 A | | 3/1988 | Foust et al. | |
| 4,746,845 A | | 5/1988 | Mizuta et al. | |
| 4,823,059 A | | 4/1989 | Compeau et al. | |
| 4,831,509 A | | 5/1989 | Jones et al. | |
| 4,855,653 A | | 8/1989 | Lemirande | |
| 4,870,333 A | | 9/1989 | Itoh et al. | |

(Continued)

*Primary Examiner* — Marlo Fletcher
(74) *Attorney, Agent, or Firm* — Tarolli, Sundheim, Covell & Tummino LLP

(57) ABSTRACT

Disclosed is an improved system and method for sensing both hard and soft obstructions for a movable panel such as a sunroof. A dual detection scheme is employing that includes an optical sensing as the primary means and electronic sensing of motor current as a secondary means. The secondary means utilizes system empirical precharacterization, fast processing algorithms, motor parameter monitoring including both current sensing and sensorless electronic motor current commutation pulse sensing, and controller memory, to adaptively modify electronic obstacle detection thresholds in real time without the use of templates and cycle averaging techniques.

10 Claims, 9 Drawing Sheets

U.S. PATENT DOCUMENTS

| | | | |
|---|---|---|---|
| 4,980,618 A | 12/1990 | Milnes et al. | |
| 5,038,087 A | 8/1991 | Archer et al. | |
| 5,039,925 A | 8/1991 | Schap | |
| 5,069,000 A | 12/1991 | Zuckerman | |
| 5,081,586 A | 1/1992 | Barthel et al. | |
| 5,131,506 A | 7/1992 | Mizuno et al. | |
| 5,140,316 A | 8/1992 | DeLand et al. | |
| 5,162,711 A | 11/1992 | Heckler | |
| 5,204,592 A | 4/1993 | Huyer | |
| 5,218,282 A | 6/1993 | Duhame | |
| 5,278,480 A | 1/1994 | Murray | |
| 5,334,876 A * | 8/1994 | Washeleski et al. | 307/10.1 |
| 5,399,950 A | 3/1995 | Lu et al. | |
| 5,404,673 A * | 4/1995 | Takeda et al. | 49/28 |
| 5,432,413 A | 7/1995 | Duke et al. | |
| 5,436,539 A | 7/1995 | Wrenbeck et al. | |
| 5,497,326 A | 3/1996 | Berland et al. | |
| 5,525,876 A | 6/1996 | Filippi | |
| 5,530,329 A | 6/1996 | Shigemaatsu et al. | |
| 5,537,013 A | 7/1996 | Toyozumi et al. | |
| 5,539,290 A | 7/1996 | Lu et al. | |
| 5,585,702 A * | 12/1996 | Jackson et al. | 318/266 |
| 5,616,997 A * | 4/1997 | Jackson et al. | 318/467 |
| 5,701,063 A | 12/1997 | Cook et al. | |
| 5,708,338 A * | 1/1998 | Cook et al. | 318/466 |
| 5,723,960 A | 3/1998 | Harada | |
| 5,729,104 A | 3/1998 | Kamishima et al. | |
| 5,734,245 A * | 3/1998 | Terashima et al. | 318/453 |
| 5,832,664 A | 11/1998 | Tajima et al. | |
| 5,932,931 A * | 8/1999 | Tanaka et al. | 307/10.1 |
| 5,952,801 A * | 9/1999 | Boisvert et al. | 318/468 |
| 5,955,854 A | 9/1999 | Zhang et al. | |
| 5,969,637 A | 10/1999 | Doppelt et al. | |
| 5,982,124 A | 11/1999 | Wang | |
| 6,064,165 A * | 5/2000 | Boisvert et al. | 318/465 |
| 6,097,166 A * | 8/2000 | Fitzgibbon et al. | 318/471 |
| 6,107,765 A * | 8/2000 | Fitzgibbon et al. | 318/266 |
| 6,111,374 A * | 8/2000 | Fitzgibbon et al. | 318/282 |
| 6,133,703 A * | 10/2000 | Fitzgibbon et al. | 318/445 |
| 6,169,379 B1 * | 1/2001 | Zhang et al. | 318/280 |
| 6,172,475 B1 * | 1/2001 | Fitzgibbon et al. | 318/266 |
| 6,208,102 B1 * | 3/2001 | Kikuchi et al. | 318/466 |
| 6,243,635 B1 | 6/2001 | Swan et al. | |
| 6,246,196 B1 * | 6/2001 | Fitzgibbon et al. | 318/430 |
| 6,274,947 B1 * | 8/2001 | Terashima | 307/10.1 |
| 6,278,249 B1 * | 8/2001 | Fitzgibbon et al. | 318/268 |
| 6,310,451 B1 * | 10/2001 | Fitzgibbon et al. | 318/266 |
| 6,377,009 B1 | 4/2002 | Philipp | |
| 6,400,112 B1 * | 6/2002 | Fitzgibbon et al. | 318/445 |
| 6,404,158 B1 * | 6/2002 | Boisvert et al. | 318/469 |
| RE37,784 E * | 7/2002 | Fitzgibbon et al. | 318/466 |
| 6,456,022 B1 * | 9/2002 | Fitzgibbon et al. | 318/162 |
| 6,528,961 B1 * | 3/2003 | Fitzgibbon et al. | 318/283 |
| 6,548,979 B2 * | 4/2003 | Boisvert et al. | 318/469 |
| 6,566,828 B2 * | 5/2003 | Fitzgibbon et al. | 318/283 |
| 6,683,431 B2 * | 1/2004 | Fitzgibbon et al. | 318/468 |
| 6,806,665 B2 * | 10/2004 | Fitzgibbon et al. | 318/282 |
| 7,164,246 B2 * | 1/2007 | Fitzgibbon et al. | 318/264 |
| 7,548,037 B2 * | 6/2009 | Boisvert et al. | 318/466 |
| 7,579,802 B2 * | 8/2009 | Boisvert et al. | 318/466 |
| 2001/0024094 A1 * | 9/2001 | Fitzgibbon et al. | 318/445 |
| 2001/0024095 A1 * | 9/2001 | Fitzgibbon et al. | 318/480 |
| 2001/0038272 A1 * | 11/2001 | Fitzgibbon et al. | 318/565 |
| 2002/0084759 A1 * | 7/2002 | Fitzgibbon et al. | 318/283 |
| 2002/0093301 A1 * | 7/2002 | Itami et al. | 318/452 |
| 2002/0101210 A1 * | 8/2002 | Boisvert et al. | 318/469 |
| 2003/0025470 A1 * | 2/2003 | Fitzgibbon et al. | 318/66 |
| 2004/0056621 A1 * | 3/2004 | Fitzgibbon et al. | 318/445 |
| 2004/0183493 A1 * | 9/2004 | Boisvert et al. | 318/469 |
| 2004/0195986 A1 * | 10/2004 | Fitzgibbon et al. | 318/280 |
| 2005/0140323 A1 * | 6/2005 | Fitzgibbon et al. | 318/468 |
| 2006/0186844 A1 * | 8/2006 | Fitzgibbon et al. | 318/280 |
| 2009/0272035 A1 * | 11/2009 | Boisvert et al. | 49/28 |

* cited by examiner

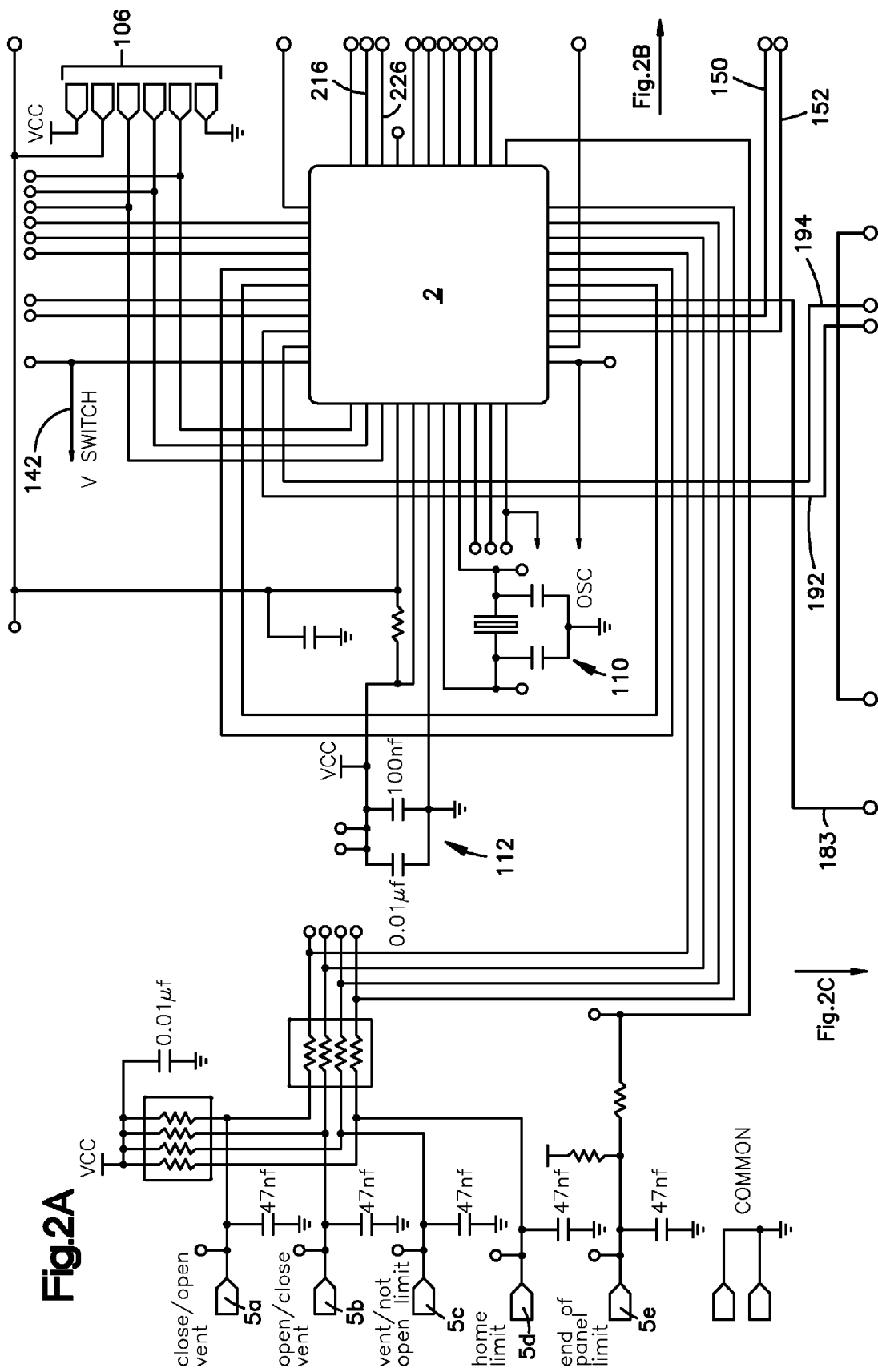

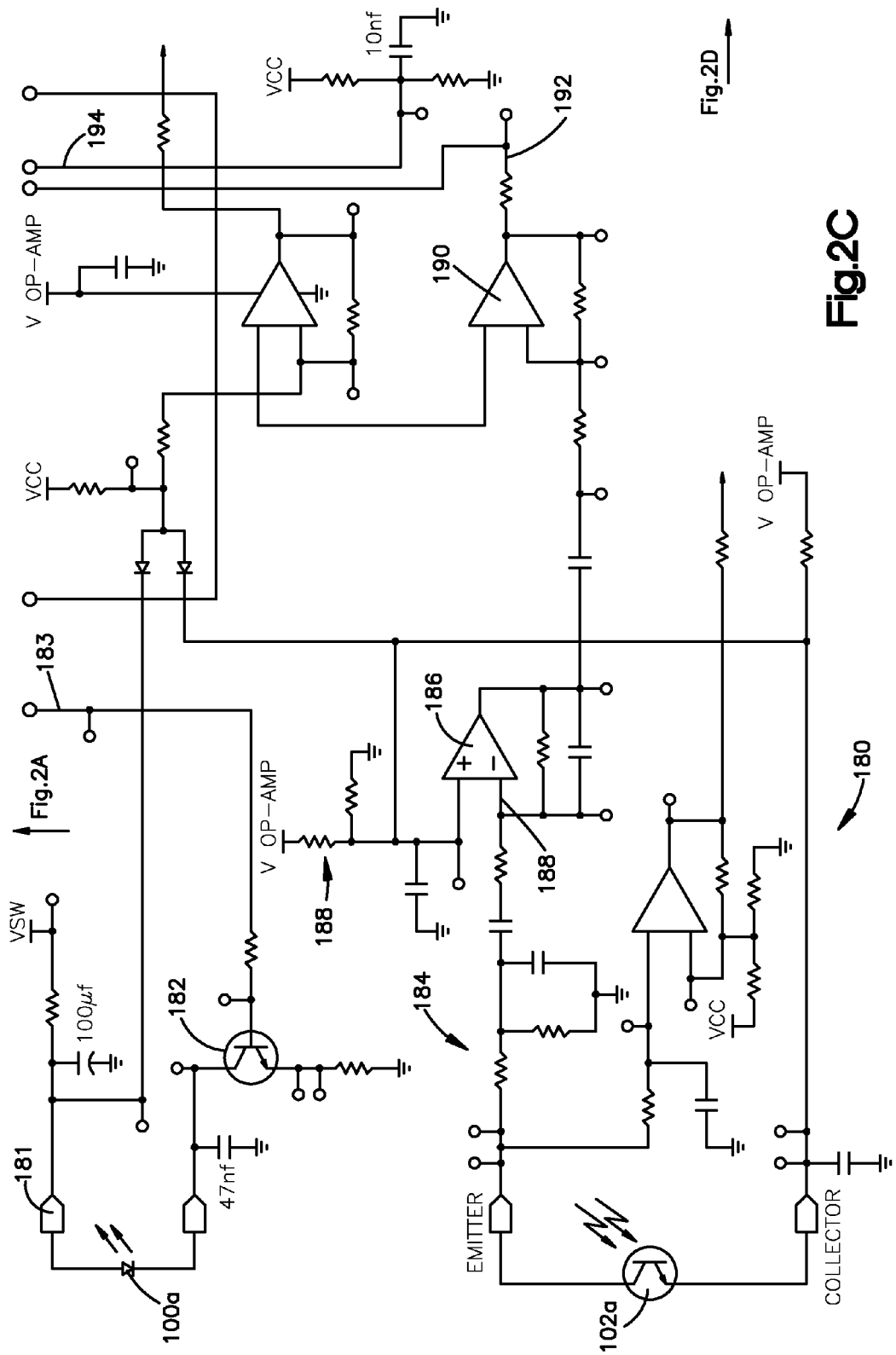

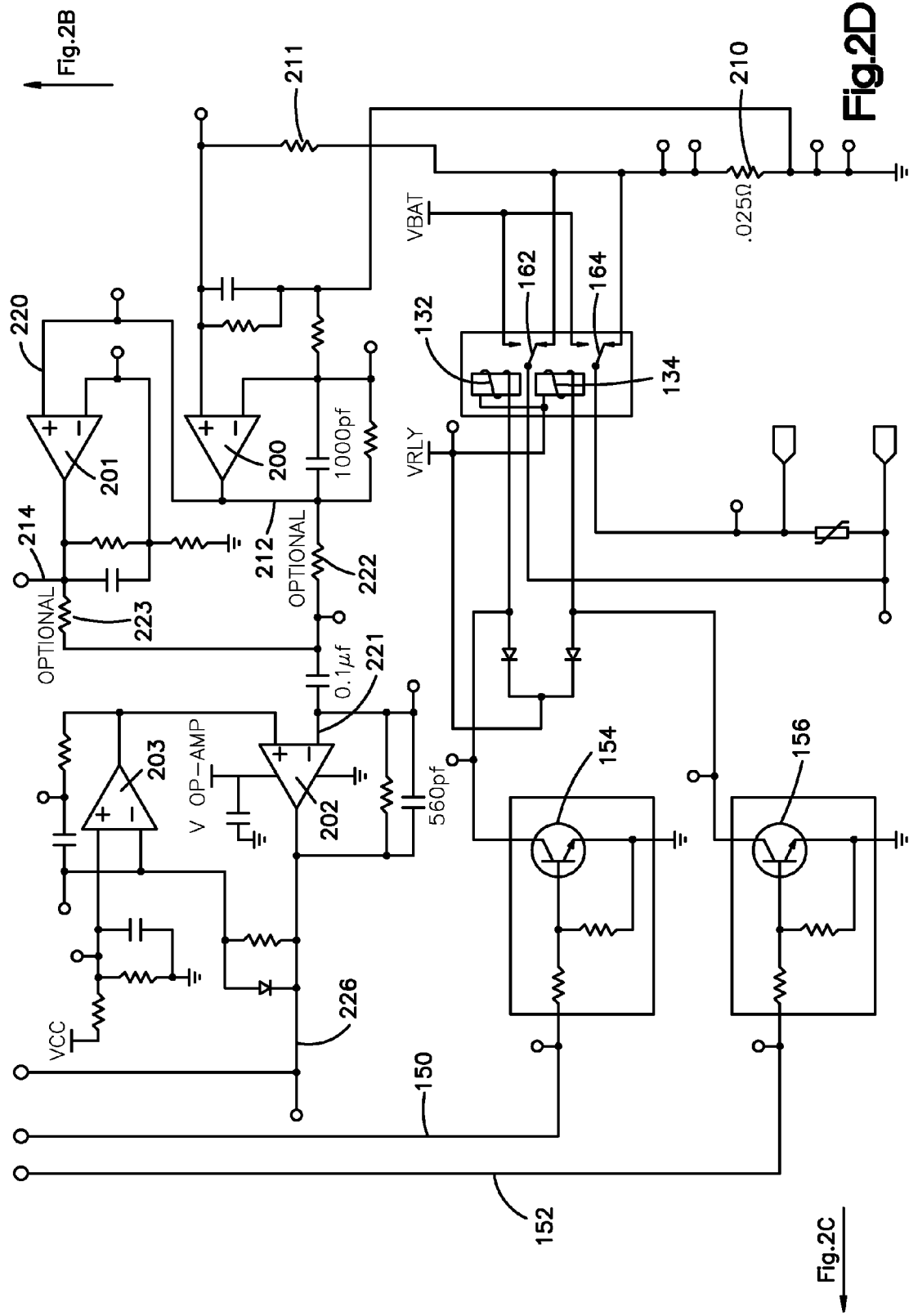

COLLISION MONITORING SYSTEM

CROSS REFERENCE TO RELATED APPLICATIONS

The present application is a continuation of application Ser. No. 10/100,892 which is a continuation-in-part of application Ser. No. 09/562,986 filed May 1, 2000 which is a continuation-in-part of application Ser. No. 08/736,786 to Boisvert et al. which was filed on Oct. 25, 1996, now U.S. Pat. No. 6,064,165 which was a continuation of U.S. application Ser. No. 08/275,107 to Boisvert et al. which was filed on Jul. 14, 1994 which is a continuation in part of application Ser. No. 07/872,190 filed Apr. 22, 1992 to Washeleski et al., now U.S. Pat. No. 5,334,876. These related applications are incorporated herein by reference. Applicants also incorporate by reference U.S. Pat. No. 5,952,801 to Boisvert et al, which issued Sep. 14, 1999. This application also claims priority from U.S. Provisional application Ser. No. 60/169,061 filed Dec. 6, 1999 which is also incorporated herein by reference.

FIELD OF THE INVENTION

The present invention concerns motor driven actuator control systems and methods whereby empirically characterized actuation operation parameters are subsequently monitored.

BACKGROUND

National Highway Traffic Safety Administration (NHTSA) Standard 118 contains regulations to assure safe operation of power-operated windows and roof panels. It establishes requirements for power window control systems located on the vehicle exterior and for remote control devices. The purpose of the standard is to reduce the risk of personal injury that could result if a limb catches between a closing power operated window and its window frame. Standard 118 states that maximum allowable obstacle interference force during an automatic closure is less than 100 Newton onto a solid cylinder having a diameter from 4 millimeters to 200 millimeters.

Certain technical difficulties exist with operation of prior art automatic power window controls. One difficulty is undesirable shutdown of the power window control for causes other than true obstacle detection. Detection of obstacles during startup energization, soft obstacle detection, and hard obstacle detection each present technical challenges requiring multiple simultaneous obstacle detection techniques. Additionally, the gasket area of the window that seals to avoid water seepage into the vehicle presents a difficulty to the design of a power window control, since the window panel encounters significantly different resistance to movement in this region. Operation under varying power supply voltage results in actuator speed variations that result in increased obstacle detection thresholds.

SUMMARY OF THE INVENTION

This invention concerns an improved actuator system that provides faster operation, more sensitive obstacle detection, faster actuator stopping with reduced pinch force, and reduced false obstacle detection all with less costly hardware. This invention has utilization potential for diverse automatic powered actuator applications including positioning of doors, windows, sliding panels, seats, control pedals, steering wheels, aerodynamic controls, hydrodynamic controls, and much more. One exemplary embodiment of primary emphasis for this disclosure concerns an automatic powered actuator as a motor vehicle sunroof panel.

An exemplary system built in accordance with one embodiment of the invention implements position and speed sensing is via electronic motor current commutation pulse sensing of the drive motor. Motor current commutation pulse counting detection means and counting correction routines provide improved position and speed accuracy.

In one exemplary embodiment, stored empirical parameter characterizations and algorithms adaptively modify obstacle detection thresholds during an ongoing actuation for improved obstacle detection sensitivity and thresholds resulting in quicker obstacle detection with lower initial force, lower final pinch force and reduced occurrences of false obstacle detection.

An exemplary embodiment of the collision sensing system uses a memory for actuation speed measurement, motor current measurement, and calculations of an ongoing actuation with real time adaptive algorithms enables real time running adaptive compensation of obstacle detection thresholds.

BRIEF DESCRIPTIONS OF THE DRAWINGS

FIGS. 2A-2D are schematics of circuitry for controlling movement and sensing obstructions of a motor driven panel such as a motor vehicle sunroof;

BEST MODE FOR PRACTICING THE INVENTION

Figure 1:
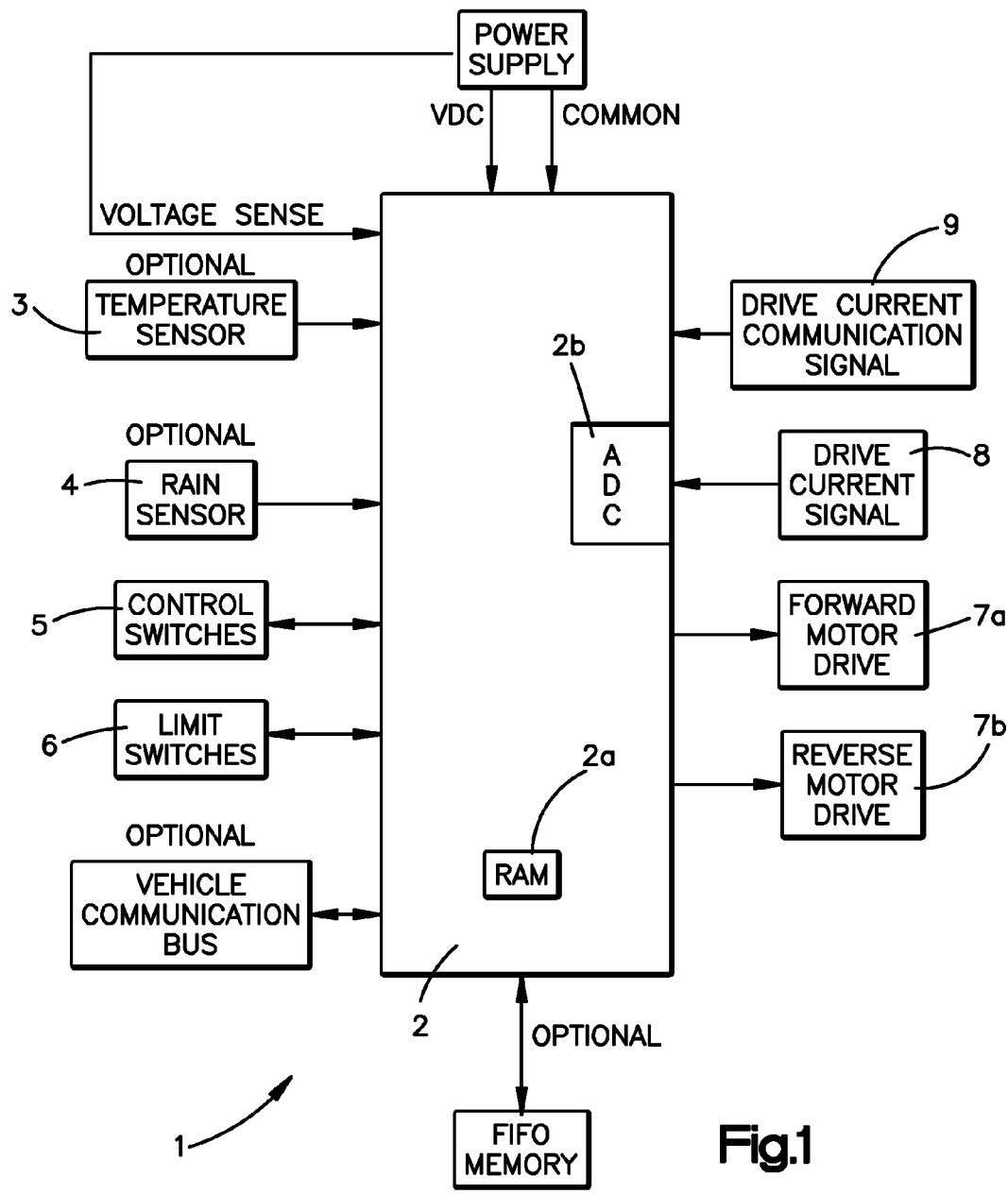
FIG. 1 is a block diagram schematic of the components of an exemplary embodiment of the present invention.
Figure 8:
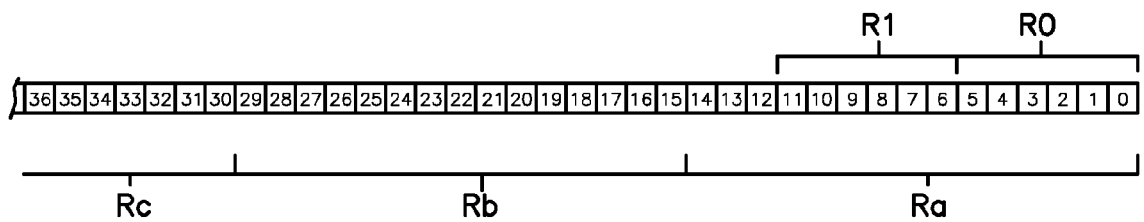
FIG. 8 is a sequence of measurements taken by a controller during successive time intervals and operation of a monitored panel drive motor.

FIG. 1 shows a functional block diagram of an actuator safety feedback control system 1 for monitoring and controlling movement of a motor driven panel such as a motor vehicle sunroof. A panel movement controller 2 includes a commercially available multipurpose microcontroller IC (integrated circuit) with internal and/or external FIFO memory and/or RAM (Random Access Memory) 2a and ADC (analog-to-digital-converter) 2b.

Eight-bit word bytes, eight-bit counters, and eight-bit analog-to-digital conversions are used with the exemplary controller 2. It should be fully realized, however, that alternative word lengths may be more appropriate for systems requiring different parameter resolution. Larger word bytes with equivalent ADC resolution enables greater resolution for motor current sensing. Likewise, larger word bytes with higher microcontroller clock speeds enable greater resolution for motor per speed sensing plus quicker digital signal processing and algorithm processing for quicker response time.

A temperature sensor 3 (which according to the preferred embodiment of the invention is an option) when installed, is driven by and sensed by the controller 2. Temperature sensing allows the panel controller 2 to automatically sense vehicle cabin temperature and open or close the sunroof to help maintain a desired range of temperatures. Temperature compensation of actuator obstacle detection thresholds is typically unnecessary.

An optional rain sensor 4 can be both driven by and sensed by the microcontroller 2. Automatic closing of the sunroof panel occurs when the sensor is wet. Subsequently, the sunroof panel can be opened when either falling rain has stopped for some time duration or when the rain has evaporated to some extent.

Manual switch inputs 5 are the means by which operator control of the system occurs.

Limit switch inputs 6 indicate to the control system such physical inputs as HOME position, VENT/NOT OPEN Quadrant Switch, and end of panel movement. Limit switch signals indicate where microcontroller encoder pulse counter registers are set or reset representative of specific panel position(s).

Motor drive outputs 7a and 7b control whether the motor drives the panel in the forward or the reverse direction. When neither the forward nor the reverse direction are driven, the motor drive terminals are electrically shorted together, possibly via a circuit node such as COMMON, resulting in an electrical loading and thus a dynamic braking effect.

Motor plugging drive, which is the application of reverse drive polarity while a motor is still rotating, is an optional method of more quickly stopping the motor, but has been unnecessary for use with the preferred embodiment of the sunroof panel controller due to satisfactory performance taught by this disclosure. Very large motor plugging currents are often undesirable because they can easily exceed typical maximum stalled rotor currents producing undesired motor heating in large applications. Such high motor plugging currents can be detrimental to the life and reliability of electromechanical relay contacts and solid state switches used to switch motor operating currents. High motor plugging currents can also cause undesirable transients, trip breakers, and blow fuses in a power supply system.

Application of brakes and/or clutches is also unnecessary with the automotive sunroof system due to the improved real time obstacle detection performance taught by this disclosure.

Optical Obstacle Detection

Obstacle detection by actual physical contact and/or pinch force with human subjects is somewhat unnerving to some individuals. For improved system safety and user comfort, the preferred system utilizes non-contact detection of obstacles in the path of the moving panel. Of various technologies by which it is possible to sense an obstacle without physical contact, IR (infrared) emission with transmission interruption mode detection is preferred. IR emitting diodes and/or IR laser diodes are the two preferred IR emission sources. IR photodiodes and/or IR phototransistors are the two preferred IR detection means. Optical obstacle detection senses and enables stopping of the actuator movement prior to significant applied pinch force and possibly prior to actual physical contact with a subject. In unusual light conditions, explained below, optical sensing means becomes temporarily ineffective, thus obstacle detection via motor current sensing or current sensing and speed sensing means becomes the remaining reliable backup method of detecting an obstacle.

Figures 3A, 3B:
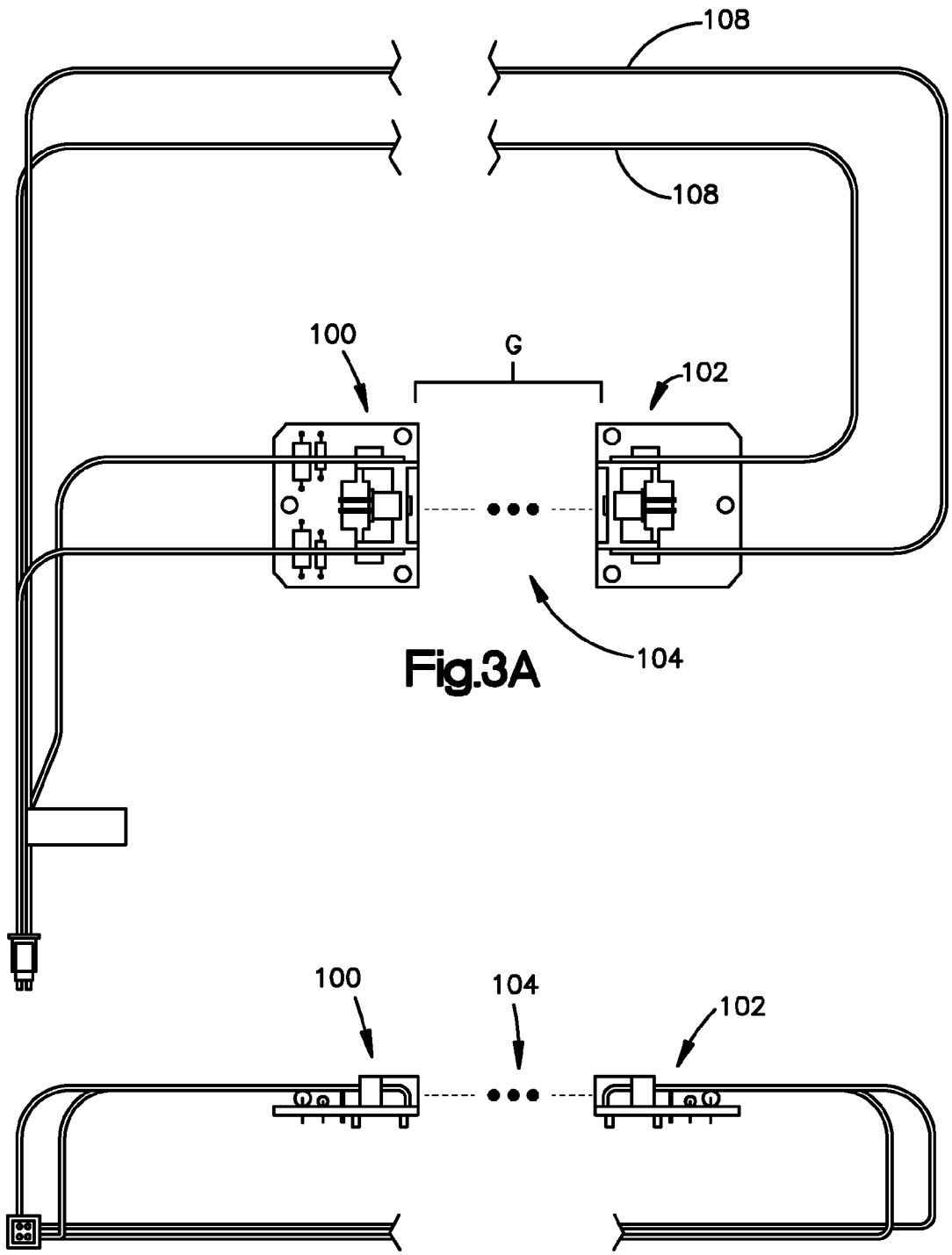
FIG. 3A is a plan view depicting an optical sensing system for monitoring an obstruction in the pinch zone of a moving panel such as a motor vehicle sunroof.
FIG. 3B is a front elevation view of the FIG. 3A optical sensing system.

Of two preferred configurations utilized for implementing IR transmission interruption mode of obstacle detection, the first is use of at least one emitter and at least one detector sensing at least across the pinch zone in close proximity to an end of travel region of a sunroof. As shown in FIGS. 3A and 3B, at least one IR emitter 100 and at least one IR detector 102 are separated from each other by a sunroof pinch zone 104. In an exemplary embodiment of the invention, opto sensing of obstructions is across and in relatively close proximity to a pinch zone near the end of travel region of a sunroof. The depictions in FIGS. 3A and 3B do not show the entire region between emitter and detector but it is appreciated that a gap G between emitter and detector is on the order of the width of the moving sunroof. In this preferred embodiment, cabling 108 passes to the region of the detector 102 around the end of the sunroof liner in the region of the end of the sunroof travel. The detector and emitter are fixed to the sunroof liner and do not move. Implementation of this fixed configuration is simplified by lack of moving components, although the sunroof may have to push the obstacle into a sensing field between the emitter 100 and the detector 102. Thus, although the sensing means is non-contact, the sunroof can still contact the obstacle.

Figure 3C:
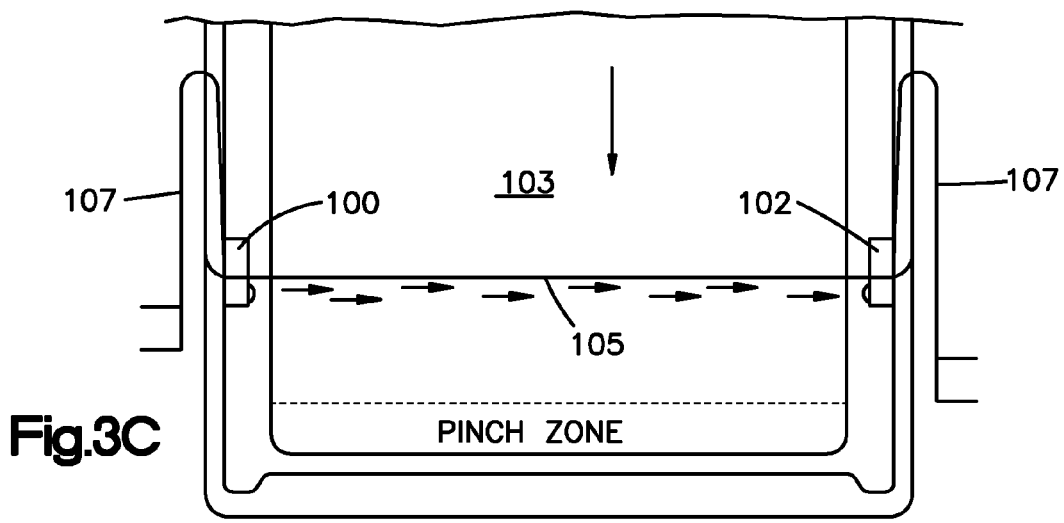
FIG. 3C is a plan view depicting an optical system with moving optics for monitoring an obstruction at the leading edge of a moving panel such as a motor vehicle sunroof.
Figure 3D:
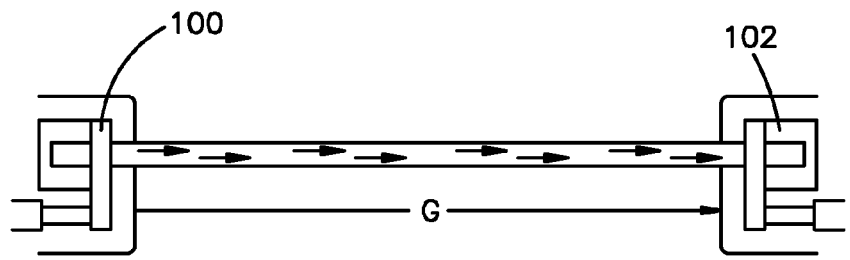
FIG. 3D is a front elevation view of the FIG. 3C optical sensing system.
Figure 3E:
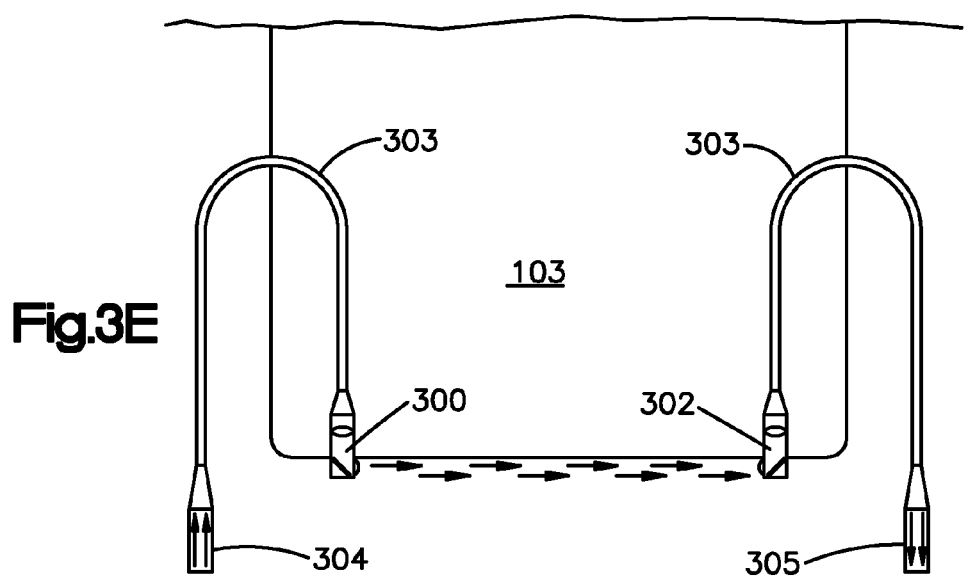
FIG. 3E is a plan view depicting an optical sensing system with moving optics, flexible optic fiber, remote IR emission, and remote IR detection for monitoring an obstruction at the leading edge of a moving panel such as a motor vehicle sunroof.

Of two preferred configurations utilized for implementing IR transmission interruption obstacle detection, the second is use of at least one emitter and at least one detector sensing at least immediately ahead of the front moving edge of the moving portion of a sunroof. As shown in FIGS. 3C and 3D, at least one IR emitter 100 and at least one IR detector 102 are separated proximal a front moving edge of a sunroof 103. In an exemplary embodiment of the invention, opto-sensing of obstructions is across and in relatively close proximity to a front edge 105 of the sunroof 103. The depictions in FIGS. 3C and 3D show the entire region between emitter and detector for which a gap G, between emitter and detector, is on the order of the width of the moving sunroof. In this preferred embodiment, flexible flat circuitry 107 passes to the emitter 100 and the detector 102 of the moving panel or window to the region of the front moving edge. Alternate means to supply electrical signal and/or power to the moving opto-electronic components includes means such as electrical contact brushes cooperating with conductive traces on the moving panel. Power and signal are optionally both transmitted over the same conductors. FIG. 3E shows an alternative means to supply IR emission to receive IR detection from the front edge of the moving panel via flexible moving optic fiber 303 means connected with components 300, 302 that respectively emit IR and detect IR signals. IR optical fibers are terminated at each end to optical components 304, 305 that perform collimating, reflecting, and focusing requirements. The structure depicted in FIGS. 3A-3E make it possible to sense obstructions with no physical obstacle contact regardless of the position of the moving sunroof.

Alternate, non-preferred means of obstacle detection include sensing back reflection from a reflective surface of radiation emitted from an emitter, electric field sensing of proximal material dielectric properties, and magnetic field sensing of proximal material inductive properties.

Various techniques improve the operation and reliability of non-contact optical detection sensing. In accordance with an exemplary embodiment of the present invention, the IR emitter 100 is driven with a duty cycle and frequency. One typical automobile sunroof application uses 20% duty cycle at 500 Hz IR emitter drive synchronized with IR detector sensing. Pulsed drive allows the IR emitter 100 to be driven harder during its on time at a low average power. This harder drive yields improved signal-to-noise for IR sensing by the IR detector. The IR detector circuit synchronously compares the IR signal detected during IR emitter on times with IR emitter off times to determine ambient IR levels for drive and signal compensation purposes. This allows the IR emitter to IR detector optical coupling to be determined with a level of accuracy and reliability using closed loop feedback techniques.

Automatic gain feedback control techniques maintain the level of the IR emitter drive and/or the gain of the IR detector circuit so that optical coupling is above minimum desirable values. Such automatic gain compensates, within certain limitations, factors including decrease in IR emitter output over accumulated time at temperature, IR emitter output temperature coefficient, dirt and haze fouling optic components, and high ambient IR levels.

Highly directional IR optical lenses and/or aligned polarized filters on both the IR emitter and IR detector maintain better optical coupling and reduce the effects of ambient IR and reflected IR from other directions. Location of the IR detector in a physical recess further reduces the possibility of extraneous IR "noise" from affecting the optical coupling.

Despite various means to reduce the possibility of excess extraneous IR from being detected, certain conditions occur that may allow very high levels of direct and/or reflected sunlight to be "seen" by the detector. Sun IR power levels can saturate the detector output signal level so that obstacle blockage of the pulsed IR emitter signals is not reliably sensed. Under such unusual "white out" circumstances, the IR optical system is disabled by the panel controller 2 until the sunroof actuator is nearly closed, at which position ambient IR noise is shielded by the sunroof. Thus, the complete emitter-detector IR coupling is made more reliable for the last movement of pinch point closure. Complete body blockage of the IR coupling path between the emitter and detector is not a "white out" condition, although if the body is blocking both ambient IR and emitted IR signal at the detector, a "black out" condition is interpreted as an obstacle detection.

Although the IR obstacle detection means may be temporarily found to be unreliable by high ambient levels of IR, the disclosed sensing of hard and/or soft obstacles by motor current monitoring is always active as a redundant obstacle detection means.

Detailed Schematic

The controller schematic shown in FIGS. 2A-2D implements collision sensing in one form by activating a light emitting diode 100a which emits at periodic intervals. In the event the infra red radiation is not sensed by a photo transistor detector 102a, the controller 2 assumes an obstruction and deactivates the sunroof motor M. There is also a redundant and more reliable obstacle detection means for detecting obstacles based upon sensed motor operation parameters.

The preferred controller 2 is an Atmel 8 Bit microprocessor having 8 Kilobytes of ROM and includes programming inputs 106 which can be coupled to an external data source and used to reprogram the microprocessor controller 2. User controlled inputs 5a, 5b are coupled to user activated switches which are activated to control movement of the sunroof. The inputs are similar to now issued U.S. Pat. No. 5,952,801 to Boisvert et al, which describes the functionality of those inputs. Limit switch outputs 5c, 5d, 5e are also monitored by the controller 2 and used to control activation of the sunroof drive motor.

The schematic depicts a clock oscillator 110 for providing a clock signal of 6 MHZ for driving the microprocessor controller 2. To the upper left of the oscillator is a decoupling capacitor circuit 112 for decoupling a VCC power signal to the microprocessor.

Figure 2B:
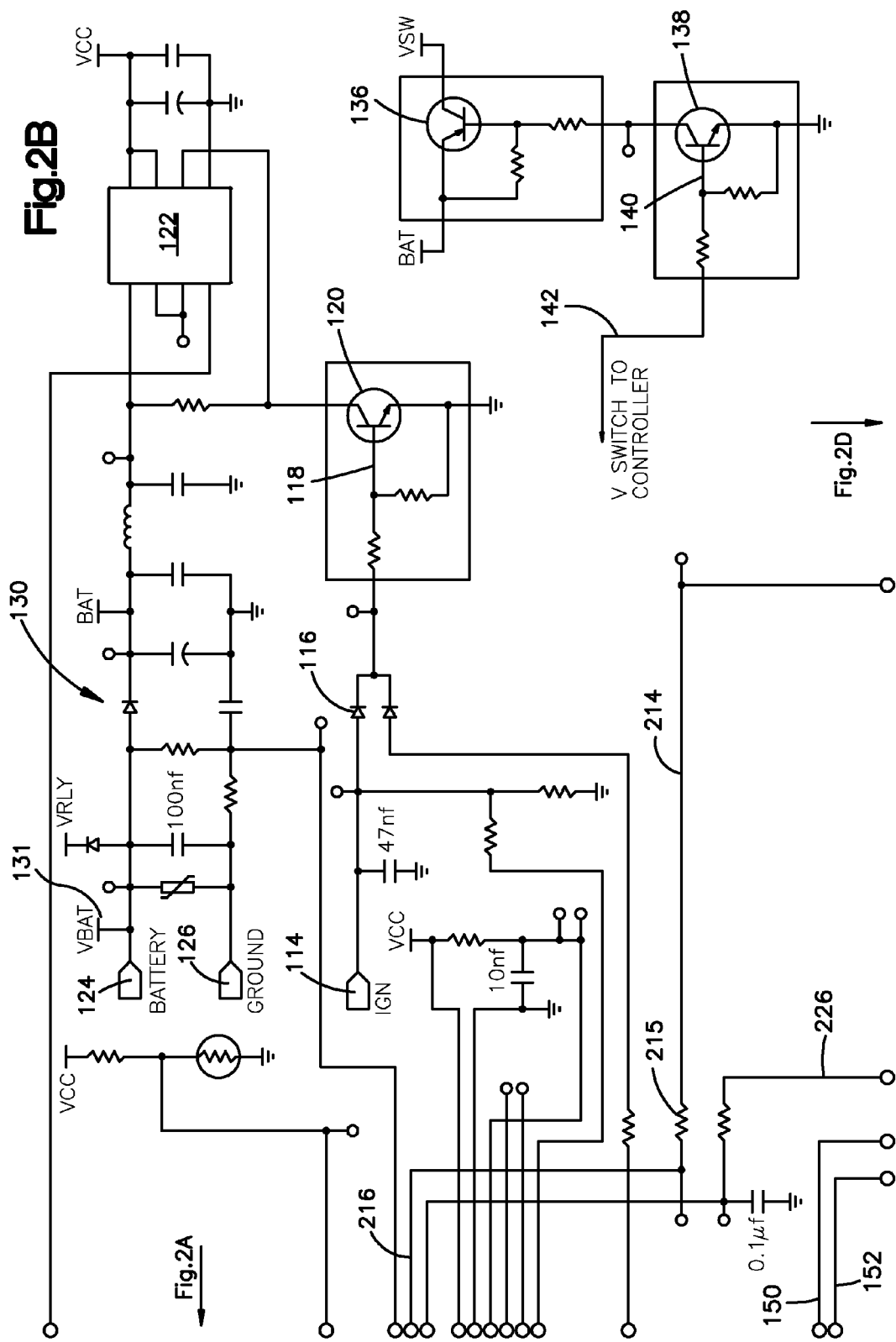

The circuitry depicted in FIG. 2B provides power signals in response to input of a high signal at the ignition input 114. When the ignition input goes high, this signal passes through a diode 116 to the base input 118 of a transistor 120 which turns on. When the transistor 120 turns on, a regulated output of 5 volts (VCC) is provided by a voltage regulator 122 in the upper right hand corner of FIG. 2B. A voltage input to the voltage regulator 122 is derived from two battery inputs 124, 126 coupled through a filtering and reverse polarity protection circuit 130. Immediately above the positive battery input 124 is a relay output 131 which provides a signal one diode drop less than battery voltage VBAT which powers the relay coils 132, 134 (FIG. 2D) for activating the motor.

The circuitry of FIGS. 2A-2D includes a number of operational amplifiers which require higher voltage than the five volt VCC logic circuitry power signal. At the extreme right hand side of the schematic of FIG. 2B are two transistors 136, 138 one of which includes a base 140 coupled to an output 142 from the microprocessor controller 2. The second transistor has its collector coupled to the battery and an output on the emitter designated V-SW. When the microprocessor turns on the transistor 138, the V-SW output goes to battery voltage. The V-SW output is connected to a voltage regulator (not shown) which generates a DC signal that is supplied throughout the circuit for operation of the various operational amplifiers.

The microprocessor controller 2 also has two motor control outputs 150, 152 which control two switching transistors 154, 156, which in turn energize two relay coils 132, 134. The relay coils have contacts 162, 164 coupled across the motor M for energizing the motor windings with a battery voltage VBAT. One or the other of the transistors must be turned on in order to activate the motor. When one of the two transistors is on, the motor M rotates to provide output power at an output shaft for moving the sunroof or other panel along a path of travel in one direction. To change the direction of the motor rotation, the first transistor is turned off and the second activated. The motor used to drive the sunroof panel back and forth along its path of travel in the exemplary embodiment of the present invention is a DC motor.

FIG. 2C depicts a circuit 180 for monitoring light emitting diode signals. A light emitting diode 100a has an anode connection 181 coupled to the V-switched signal and the cathode is coupled through a switching transistor 182 to a microprocessor output 183. The microprocessor outputs a 500 hertz signal at this output 183 having a 20% duty cycle to the base input of the transistor. When the transistor turns on, the LED cathode is pulled low, causing the light emitting diode 100a to emit IR radiation. Under microprocessor control, the light emitting diode produces a 500 hertz output which is sensed by a photo detector 102a. As the light emitting diode pulses on and off at 500 hertz, the photo detector responds to this input. When current flows in the photo detector, a voltage drop is produced across a voltage divider 184 having an output coupled to an operational amplifier 186. When current flows in the photo detector in response to receipt of a light signal the voltage divider raises the voltage at the inverting input 188 to the amplifier 186. The non-inverting input to this amplifier is maintained at 2.5 volts by a regulated voltage divider 188. The operational amplifier 186 and a second operational amplifier 190 define two inverting amplifiers which in combination produce an output signal of 500 hertz. With no signal appearing at the photo detector, an output 192 from the operational amplifier 190 is 2.5 volts. This signal is coupled to the microprocessor controller 2. In response to receipt of the photo detector signal, this signal oscillates and this oscillating signal in turn is sensed by the microprocessor.

The microprocessor controller 2 has two inputs 192, 194 that provide input signals to a comparator implemented by the microprocessor controller. As the state of the comparator changes, internal microprocessor interrupts are generated which cause the microprocessor to execute certain functions. The first input 192 is derived from the output from the phototransistor 102a. The second input 194 to the comparator is a 3.3 volt signal generated by a voltage divider 195.

Motor Current Monitoring

A motor current monitoring circuit is depicted in FIG. 2D and includes a number of operational amplifiers 200-203 coupled to a current measuring resistor 210 in the lower right hand portion of the circuit diagram. This current measuring resistor is coupled to the operational amplifier 200 configured as a differential amplifier through a second resistor 211. An output 212 from this differential amplifier is a signal proportional to the current through the motor windings which has been amplified by a factor of about four. The output from this amplifier passes to a second gain of 3 amplifier 201 to an output 214 coupled to the microprocessor controller through a resistor 215. This signal is monitored by the microprocessor and converted by an A to D conversion to a digital value directly related to motor current.

An input 220 to the second pair of operational amplifiers 202, 203 is either an output from the first differential amplifier 200 or the second gain of 3 amplifier 201 depending upon whether a resistor 222 is installed in the circuit. One but not both of the resistors 222, 223 are installed in the circuit.

The changing signal output from the resistor 210 is coupled to an inverting input of an AC coupled amplifier and produces an output signal 226 to the microprocessor controller 2 which changes with motor current and more particularly as the commutator brushes pass over the motor armature commutation segments, the signal changes to form a sequence of pulses. The amplifier 203 is a level shifting amplifier which reduces the gain of the first amplifier depending upon sensed conditions. When the motor first is activated a large current rush occurs due to the fact that the motor is stalled. This large current rush changes the output of the amplifier 203 thereby producing meaningful data even in a high current situation. As the current changes, the output of this top amplifier 203 varies to allow meaningful data to be supplied to the microprocessor regardless of absolute values of motor current.

The signal at the microprocessor is a analog signal having the ripple component as the motor rotates. This signal is in turn interpreted by the microprocessor controller 2 which generates values directly related to motor speed based upon the sensing and counting of these pulses. Additionally, the value changes in such a way that the slope can be monitored so that the microprocessor can use digital signal processing techniques on the input signal to determine a stalled motor condition representing an obstacle.

At motor startup the large currents that are experienced make it difficult to sense object collisions with the moving window or panel. In accordance with one embodiment of the invention the controller maintains a position of the leading edge of the window or panel and during certain startups will alter a startup sequence.

If the window or panel is stopped in a region where entrapment is more likely, such as in the last portion of travel just before closing of the window or panel, the motor is energized to move the window a short distance away from its stopped position away from the closed position. A controller which controls the motor then reverses motor rotation sense to move the window or panel in a direction to close the window or panel. Stated another way, the controller causes the motor to move the panel or window in a direction to open the window or panel and then change motor energization to close the window or panel. This process avoids difficult to sense obstacle detection during the initial start up period of motor operation.

The region of the window or panel seal is a region of increased motor load. In this region, in accordance with one embodiment of the invention, in response to a detection of an obstacle, the controller immediately causes motor deenergization, followed by quick reversal of actuation drive for a short distance (for example one inch). The controller then performs an immediate re-energization in the initial direction so that a more sensitive and accurate obstacle detection process can be performed. The controller can either determine that the initial obstacle detection was false due to actuator startup conditions, and thus continue to power the motor or else verify the obstacle presence that was previously detected and cause the appropriate response of stopping or alternatively stopping and reversing the window or panel for a short distance.

Measured Motor Parameters—DC Current Sensing

By monitoring the two inputs 216, 226, the microprocessor controller 2 monitors the motor current from which the controller 2 determines both sunroof incremental position and speed. Sensed motor current is always positive regardless of motor drive polarity and rotation direction. For either condition of drive polarity the non-energized side of the motor is connected to COMMON through the low value current sensing resistor 210 to produce a positive analog signal voltage directly proportionate to the motor current.

This motor current signal is converted via hardware and/or software to a filtered signal and scaled by a fixed or optionally variable reference voltage to produce a value less than a determined maximum value where the following definition applies: CUR={sensed motor current analog-to-digital-converted and scaled to engineering units}, where the analog value for motor current is converted to eight-bit digital resolution via an eight-bit ADC (analog-to-digital converter) within the microprocessor controller 2. Eight bit resolution in a controller counter for CUR yields an absolute count range of $0 \leq CUR \leq 255$, where a maximum analog reference voltage is provided to the ADC to set the anticipated maximum possible motor current limit value represented by a reference value 255.

A preferred means to increase sensed motor current resolution and thus improve obstacle detection sensitivity is to adaptively adjust the reference voltage (set=value of 255 representative of full scale) and/or the sensed motor current signal during times of relatively low current operation, returning to the highest scale during starting energization, end-stall detection, and as necessary for obstruction detection. For this eight-bit example, at least one bit of current measurement resolution can be gained during low current operation by decreasing the reference voltage by such means as a variable attenuation network and/or by scaling up the motor current signal by such means as a variable gain amplifier.

Analog motor current signal is lowpass filtered to remove noises from motor current commutation and switching transients to produce a fast running average analog drive current signal to the microcontroller representative of motor torque load conditions. This voltage signal is converted to a scaled digital value by the microprocessor. For example, normal steady operation of the motor at low battery voltage causes the controller to register a digital value of approximately 80 of full scale 255, whereas startup energization at high battery voltage will result in a peak digital value of approximately 240 of full scale 255.

Measured Motor Parameters—AC Current Sensing

Typical DC brush motor current signals also have inherent waveform AC ripples due to rotor current commutation. These motor current pulses directly relate to incremental rotation of the motor shaft and since gears and/or mechanical drive linkages link the shaft to the moving window or panel, directly relate to incremental change of position of the actuator. The relationship of motor current commutation pulses to actuator incremental motion is not necessarily a linear correspondence.

Motor current analog signal can be AC coupled, bandpass filtered, amplified, and compared with a threshold to produce a digital signal via an input representative of motor current commutation signals. Alternatively, motor current commutation signals can be directly sensed from the motor current signal via ADC and digital signal processing bandpass filtering having sufficient resolution to accurately measure the relatively lower amplitude waveforms characteristic of motor current commutation pulses.

Various alternative and more expensive incremental encoder, absolute encoder, and resolver means can produce similar signals representative of incremental or absolute motor rotor position.

A parameter monitored by the controller, indicated by a variable, PP, has generic units of time per fixed increment of motor rotation or time per distance which is defined as: PP={integer number of microcontroller clock cycles per incremental motor encoder pulse period}, alternatively referred to as inverse speed or per speed. Eight-bit resolution in an integer counter for PP yields an absolute range of $0 \leq PP \leq 255$.

An input from a resistor network provides a reference voltage (in the disclosed design about 2.5 volts) to an operational amplifier configured as a comparator. Each time the motor current commutates a generated spike is transmitted through a coupling capacitor to this comparator to "square up" the output waveform for input to the microprocessor controller. The microprocessor counts the number of microcontroller clock pulses between adjacent motor current commutation pulse signals as an indication of pulse period (PP), which is inversely proportionate to motor speed.

As an example, a relatively low count of 72 clock cycles per incremental motor encoder pulse period is representative of typical steady operation at maximum motor power supply voltage under light loading conditions whereas the count of 240 clock cycles per encoder pulse period is representative of typical transient startup energization acceleration at minimum motor power supply voltage under heavy loading conditions.

As an alternative to a presently preferred current sensing process, other means of determining motor speed are contemplated. Alternate speed sensing technologies include monitoring changes in a magnetic field and converting such changes to a speed of movement. Non-contact sensors for such monitoring include: Hall effect, magnetoresistive, magnetodiode, magnetotransistor, Wiegand effect, and variable reluctance; capacitive; and optical sensors. Such encoders are contemplated in U.S. Pat. No. 5,334,876, FIG. 5 which depicts pulses produced by a motor shaft encoder that monitors position, speed and direction of travel of a window or panel.

In accordance with an alternative embodiment of the invention, reflective and blocking sensing; generated inductive magnetic fields: ECKO (eddy current killed oscillator), variable inductor, and variable transformer; and film resistor can be used to monitor window or panel movement.

Position Accuracy

Motor current commutation pulses occur at generally regular intervals over the travel path of the panel. One representative vehicle sunroof has approximately 3000 commutation pulses over the full actuation range of the full open to the full CLOSED positions of the sunroof.

Back extrapolation of decreasing pulse periods upon startup indicates the typical loss of approximately one sensed pulse upon motor energization due to the excessive time duration of the first pulse. This lost pulse is either added or subtracted, depending upon direction of energization, to or from the actuator position counter register to increase incremental position detection accuracy.

Weak and/or missing motor pole signals, due to a faulty coil and/or commutator segment, are detected via software algorithms that call automatic compensation algorithms to maintain a corrected position counter register value. Therefore, missed motor current commutation pulses ostensibly representative of motor deceleration magnitude beyond empirically-determined limits are pulse simulated for accurate representation of motor speed and actuator position.

Extraneous pulses representative of motor acceleration beyond empirically-determined maximums are deleted from processing to maintain accurate representation of motor speed and actuator position. Adapting parameters for a DSP bandpass filter algorithm, based upon motor current and speed, enable improved motor current commutation pulse-sensing signal-to-noise ratios that result in improved accuracy for incremental position and speed sensing and ultimately in improved obstacle detection accuracy and sensitivity.

Minor corrections are made to a position counter register based upon empirical determinations of numbers of motor current commutation pulses missed due to inertial motion after motor de-energization. This number of missed pulses is based upon the speed of the motor due primarily to the monitored power supply voltage. To reduce errors in this inertial correction term, consistent motor speeds and thus consistent number of missed pulses are achieved at motor de-energization by energization of the motor for no less than a minimum time duration in response to even a very brief actuation of the manual motor energization switch. Furthermore, software debouncing of the manual switch contact deglitches the switch outputs at the microcontroller inputs by requiring the switch contacts be sensed for some minimum time to be considered as a valid control input. Excepting abnormal circumstances such a power loss and/or obstruction detection, activation of the manual motor energization switch for more than the debounce time will result in motor energization for at least a minimum amount of time, thus providing sufficient time to achieve a relatively consistent speed and also a relatively consistent number of missed pulses after de-energization.

Position Sensing & Alternatives

By counting motor current commutation pulses as an incremental encoder, the microcontroller maintains a representation of actuator position by upcounting or downcounting a position count register based upon whether the motor is being energized in a clockwise or counterclockwise direction. Limit switch inputs and/or end-of-travel stall current indications indicate where the microcontroller position counter register is either SET or RESET.

This method of position sensing is significantly simpler and less costly than alternate well-known methods of sensing position using specialized sensors such as incremental encoders, absolute encoders, and resolvers. Improvements provided by adaptive DSP bandpass filters increase the signal-to-noise and performance accuracy of this sensorless electronic position encoding method and means to render it now technically viable for this implementation.

Alternate position-sensing technologies include permanent magnet fields: Hall effect, magnetoresistive, magneto-diode, magnetotransistor, Wiegand effect, and variable reluctance; capacitive; optical: Reflective and blocking; generated inductive magnetic fields: ECKO (eddy current killed oscillator), variable inductor, and variable transformer; and film resistor.

No Template Calibration—Simple Position & Range Learning

Upon powerup, the calibration and/or learning of characteristic current and/or speed versus position may not be necessary. In accordance with certain embodiments of the invention, the only required learning is the absolute position of the actuator from a position input so that an incremental position counter can be either SET or RESET. This true position can be provided by such means as a limit switch, a Hall-effect switch at a known actuator position, and/or by sensing motor stall conditions at the ends of travel. Resetting the absolute position counter is necessary with some embodiments that sense motor commutation pulses for incremental position encoding. Alternatively, the use of a more expensive absolute encoders having no such incremental position counter and requiring no such resetting is a performance versus cost engineering design tradeoff decision. By measuring the position of the roof through the sensor on the motor, the full open and close positions can be determined without the need of additional limit switches or sensors to determine end-of-travel. Also, the true position can be determined by the end-of-travel by the current of the motor, or the preferred method is to detect no position movements through the motor position sensor and detect end-of-travel and therefore stall. The compensation for the window sizes and travels can be pre-programmed via memory locations at the factory or it can be programmed in a training of installation mode thus eliminating the need for additional end-of-travel switches for home positions.

For certain cases the sunroof controller can be used with more than one type of sunroof, therefore calibration is really a misnomer for what amounts to determining which type of sunroof mechanism is being controlled by learning the characteristic range of allowable motion of the cooperating mechanism, as well as the actuator position. The calibration step need only be performed the first time power is applied to the circuit, or if the physical characteristics of the sunroof change. Until calibration is performed, a automatic operation express mode movement feature is inhibited.

Recalibration can be initiated at any time the user feels that the control circuit is not performing as it should and must always be done if either the controller 2 or the sunroof is changed. The size of the roof is recorded in the EEPROM as well as an identification word flag to enable sunroof operation in the express mode. The position of the sunroof is recorded in the EEPROM each time the sunroof is stopped from moving. This is done to guarantee that in the case of a power down situation, the current position of the sunroof is always known. If at any time the position is considered to be unknown, the express mode is disabled until the next time the sunroof is moved to the fully CLOSED or home position.

The calibration learning of the movement range and position of the sunroof are learned and recorded as follows. The ignition is turned OFF and within five seconds the OPEN switch is pressed and the ignition is switched ON. The controller 2 attempts to find the HOME or PARK position then proceeds to find the limit of the open area or the sunroof, i.e. the fully open position. When a stall condition is sensed the size of the sunroof open area (by count of motor encoder pulses) is recorded and the controller reverses the direction toward the PARK position. The controller then finds the limit of the vent area by driving the sunroof toward the full VENT position until a stall condition is sensed. A stall condition is determined when analog-to-digital converted motor current is equal to or greater to 180 on the unitless current scale ranging from 0 to 255. If it is not possible to perform the calibration due to a failure to find the park position, no information is recorded and the sunroof express mode (automatic operation) is disabled.

Soft Stop

High position sensing resolution and accuracy enable the actuation system to anticipate the mechanical limit and thus deenergize the motor drive just prior to the actuator hitting its hard stop limit. This saves wear and tear on the mechanism as well as aids in maintaining high motor commutation pulse sensing accuracy. Mechanical "windup" of actuator drive components is significantly reduced by deenergizing and thus stopping the actuator before the torque becomes unnecessarily excessive. Reduction of mechanical windup further improves the consistency of the motor current commutation pulse train of a subsequent motor energization, thus enabling both improved capability of obstacle detection at startup and quicker obstacle detection threshold adaptation. Utilization of motor current commutation pulse sensing as an incremental encoder is enhanced in both speed and position accuracy by reduction of pulse sensing errors associated with windup relaxation and erratic motor pulse train upon startup.

Soft stop also limits high values of end-of-travel motor current, thus enabling improved current sensing resolution by use of a lower ADC motor current reference value that is significantly closer to normal operating value than to higher stall value. High position sensing accuracy enables improved position-related determination of critical and fast-changing obstacle detection thresholds. High position sensing accuracy also enables accurate anticipation of increased motor loading due to the elastomeric environmental seal near the closing of the panel, thus obstacle detection thresholds are appropriately increased as a function of position.

Digital Signal Processing

Motor current is sensed by preferred DSP techniques that provide lowpass software filtering of the motor current signal to filter out electrical noises, especially the undesirable frequency ranges characteristic of commutation pulses, switching transients, pulse drive transients, and drive transients.

Motor current commutation pulses are sensed by preferred DSP techniques that provide bandpass software filtering of the motor current signal to highpass filter out the DC motor current signal and to lowpass filter out electrical noises and especially the undesirable frequency ranges characteristic of pulse width drive transients, when applicable.

Additionally, adaptive DSP algorithms modify the obstacle detection thresholds in real time response to actual monitored motor operation parameters. A static shift in motor current and/or speed will result in a related shift in obstacle detection threshold. A transient dynamic motor current and/or speed will result in a related shift in obstacle detection threshold. Sensed periodic cyclical dynamic motor current and/or speed will result in a related periodic cyclical obstacle detection threshold.

Advantages of DSP versus hardware implementation as described above include smaller circuit size, fewer components, lower cost, lower mass, and especially ability to adapt filter algorithms for pulse detection thresholds during operation to improve performance characteristics.

Variable Load Parameters—Adaptive Obstacle Detection Threshold

With the sunroof panel automatic powered actuator system, normal vehicle inside-to-outside relative pressure differences and/or wind buffeting can cause respective static, periodic dynamic, and/or transient dynamic variations in the effective actuator motor loading and thus in the motor current that is compensated for by algorithms for adaptive obstacle detection thresholds. Increasing vehicle wind speed and/or operation of forced vehicle ventilation can produce static pressure differences that increase the load on the sunroof panel motor during operation. Increasing vehicle wind speed and/or external conditions can produce cyclical wind buffeting conditions that correspondingly cyclically alters the motor loading. Amplitude and frequency of cyclical buffeting as fluid vortices is a function of relative fluid velocity. In certain circumstances, there is a relationship between cyclical wind buffeting and static differential air pressure. Obstacle detection thresholds are actively modified with increasing vehicle air speed and with increasing wind buffeting to reduce false obstacle detection. It is anticipated that information about the vehicle speed and/or direction can provide value to the sunroof application by correlation with characteristic loading of the vehicle sunroof and/or window operation.

Unique software algorithms enable characteristic determination of real time actuator operation load categorized as startup transient, nominal, static variable, periodic dynamic variable, transient dynamic, soft obstacle, and hard obstacle. Nominal load is the characteristic motor current and speed as empirically pre-characterized for the actuator. Static variable represents a steady factor of the nominal load by which the ongoing nominal actuation is correspondingly factored up or down. Transient dynamic load represents temporary load magnitude excursion terms by which the ongoing nominal actuation parameter is altered. Periodic dynamic is a cyclical load term by which the ongoing nominal actuation is cyclically loaded with a regular period and amplitude.

Figure 5:
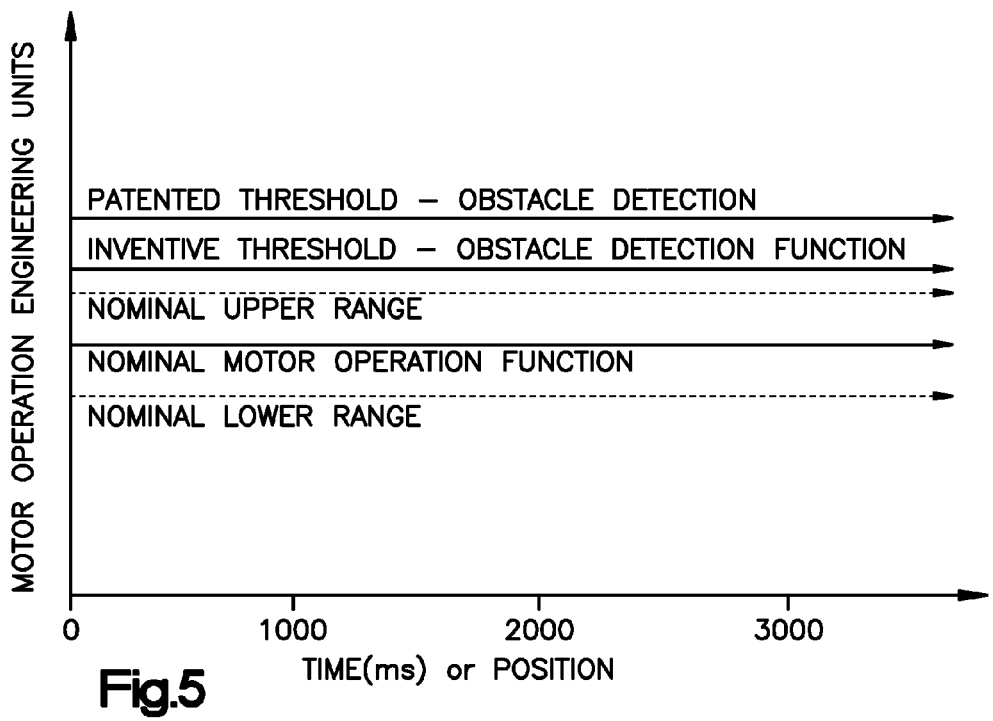
FIG. 5 represents a simplified example of characteristic steady state nominal motor operation function versus time or position.
Figure 6:
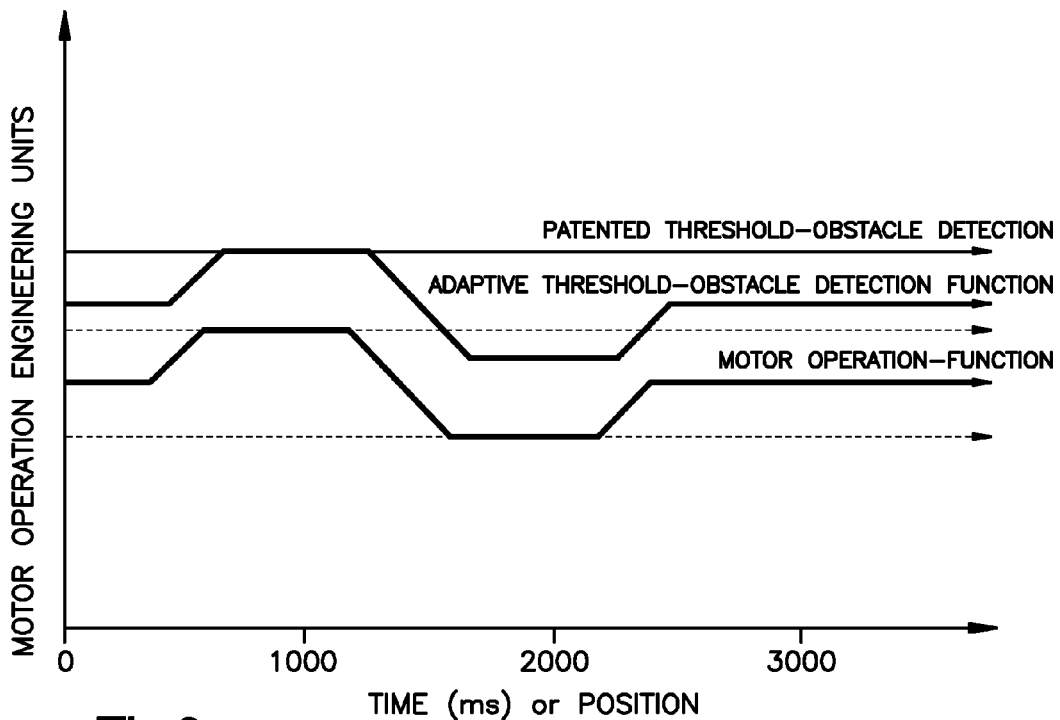
FIG. 6 represents a simplified example characteristic dynamic transient motor operation function versus time and/or position showing motor operation function with transients.
Figure 7:
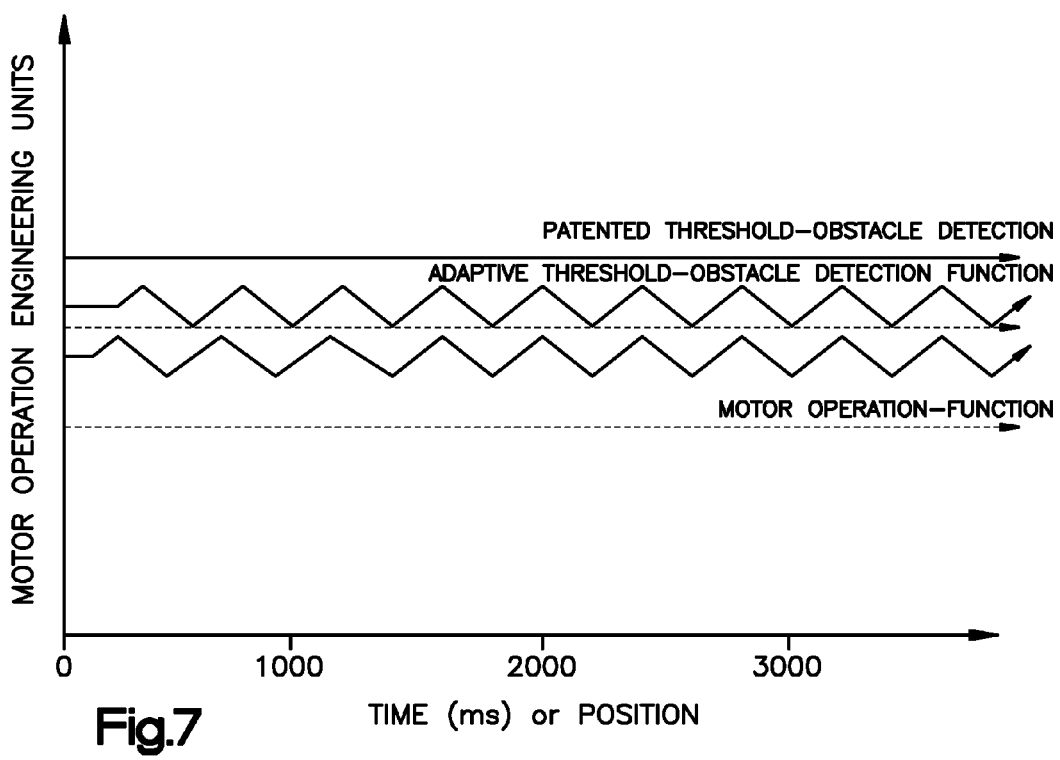
FIG. 7 represents a simplified example characteristic dynamic periodic cyclic motor operation function versus time and/or position showing motor operation function with cyclic disturbances.

FIGS. 5-7 show simplified examples of how DSP is applied in real time to alter and reduce obstacle detection function thresholds for increased obstacle detection sensitivity tolerances. The inventive obstacle detection function threshold adaptively responds via superposition of individual responses to various simultaneous types of load disturbance variables herein described.

FIG. 5 shows an example of a simplified case of a typical obstacle detection threshold based on template technology versus the adaptive obstacle detection function threshold of the present invention. The relatively large and fixed obstacle detection threshold accommodates the three types of system load variables described above. Adaptive obstacle detection achieves comparatively lower threshold values with higher sensitivity than fixed threshold systems by virtue of its ability to adapt to various types of system load variables.

FIG. 6 shows an example of a simplified case of a DSP adapting the obstacle detection function threshold in real time to accommodate dynamic load shifts. Note that the adaptive threshold tracks the motor operation function with intentional adaptive response delay time and slew rate. The degenerate case of a static load shift is not shown, although somewhat similar to FIG. 6. A comparatively lower threshold value and higher sensitivity is achieved by virtue of the ability to adapt to various types of system load variables.

FIG. 7 shows an example of a simplified case of inventive DSP adapting the obstacle detection function threshold in real time to accommodate periodic cyclic dynamic load variations. Initially, before periodicity is ascertained, the adaptive response delay time of FIG. 6 prevails. Upon a determination that the disturbance is strictly periodic, as with a bad gear tooth, after perhaps three cycles, the adaptive response delay time delay time is reduced to more accurately track the known periodicity of the cyclic disturbance. A comparatively lower threshold value and thus higher sensitivity is provided by the ability to adapt to various types of system load variables. Note that after cyclical periodicity of the disturbance is established, the normally lagging response of the adaptive threshold obstacle detection function becomes predictive so the periodicity of the dynamic response of the adaptive threshold obstacle detection function becomes in phase with the related dynamic disturbance of the motor operation function. Thus, the adaptive threshold more closely tracks actual motor operation function. The net result is obstacle detection with greater sensitivity to real obstacles with reduced occurrences of false obstacle detection.

The engineered characteristic response time, slew rate, and frequency response of the real time adaptive obstacle detection threshold algorithm must respond in a manner significantly less than 180 degrees out of phase with anticipated cyclical load variables, yet not so fast as to interfere with either hard and/or soft obstacle detection algorithms. These adaptive threshold response constraints effectively limit how fast the real time adaptive obstacle detection function threshold is allowed to change in response to changes in load variable that are ascertained to be not caused by hard or soft obstacle interference. It is important to see that the real time adaptive obstacle detection function threshold is equal or lower than the fixed obstacle detection threshold. Lower obstacle detection function thresholds produce more sensitive obstacle detection, faster obstacle detection, faster actuator deenergization, faster actuator stopping, and lower peak obstacle force at final stopping position.

Reduced Actuation Speed

Circuitry disclosed in U.S. Pat. No. 5,334,876 uses a PWM (pulse width modulated) activation of the motor windings of a direct current motor to control and/or regulate the speed of motor output shaft rotation as the motor opens or closes the window or panel. The present system preferably applies full battery voltage of a motor vehicle across the motor to drive actuator panel motion. As the motor controller industry learns to meet obstacle detection anti-pinch force regulations, it is fully anticipated that allowable forces might be lowered, possibly resulting in the necessity to use motor drive speed-reducing techniques to enable full regulatory compliance.

Typical applications of drive power to a motor include full power supply voltage, fixed duty cycle pulse drive, PWM (pulse width modulation) to regulate average motor speed and/or acceleration, pulse repetition modulation to regulate average motor speed and/or acceleration, linear drive of a fixed fraction of the full power supply voltage, linear drive of a fixed voltage, controlled linear drive to regulate average motor speed and/or acceleration, and phase angle switching control for AC motor applications. Switching transients are reduced and RFI/EMC is improved for any of the above switchmode methods of motor drive by filtering the drive output and/or controlling the slew rate of turn on and/or turn off of the motor drive power.

Relays and power contactors are typically utilized for relatively slow power control applications such as for switching on/off and for switching energization between forward and reverse. Solid state switches are typically utilized for relatively fast power control switching applications. Solid state linear drive components typically require significant heat sinks to dissipate the waste heat, although the relatively smooth output drive voltages are best for motor drive and low RFI EMC issues. Furthermore, AC motor applications typically use triacs or SCRs (silicon controlled rectifiers) for phase switching control of motor power.

Generic Obstacle Detection

To detect an obstruction when the sunroof panel is closing in its automatic operation mode, in brief, the microprocessor measures the motor current and speed for the ongoing actuation and compares against an empirically-determined algorithm within the controller for motor current and speed versus position and/or time. When calculations based upon sensed current, pulse period, derivatives thereof, and actuator position cause a calculated threshold to be exceeded, an obstruction is ascertained and the sunroof is brought back to its full OPEN or full VENT position.

A trippoint calculation utilizes memory buffers to store motor operation parameter information needed to make a determination about obstruction detection. If the sunroof is calibrated and is subsequently placed in the automatic close mode, the controller 2 uses the contents of these buffers to determine the presence of an obstruction. Variations of numerical term and factor values of the obstacle detection threshold algorithm of cited references, commonly owned, are fully anticipated per empirical characterization of any particular actuation system. Such term and factor values can be predetermined and/or adaptive via DSP algorithms. It is impractical to even attempt to show all apparent variations.

Trip point algorithms are based upon empirically obtained measurements from actuations over chosen ranges of operating conditions.

The pulse period relates to sunroof speed. As the speed increases, factors that utilize pulse period (PP) cause obstruction indication more easily than at low speed. Stated another way, the threshold is made to be close to the operating current since there is a shorter time to react to the occurrence of an obstruction.

Other terms relate to motor current. Another term avoids obstruction sensing for a sharp current increase due to spurious and short lived currents that might otherwise cause false obstruction detection. Nominal values for I (motor current) are from 40 to 80. These do not correspond to units of amperes or milliamperes, but are instead scaled engineering units based upon the motor and circuitry used to sense the motor current.

Startup Obstruction Detection Summary

Figure 4:
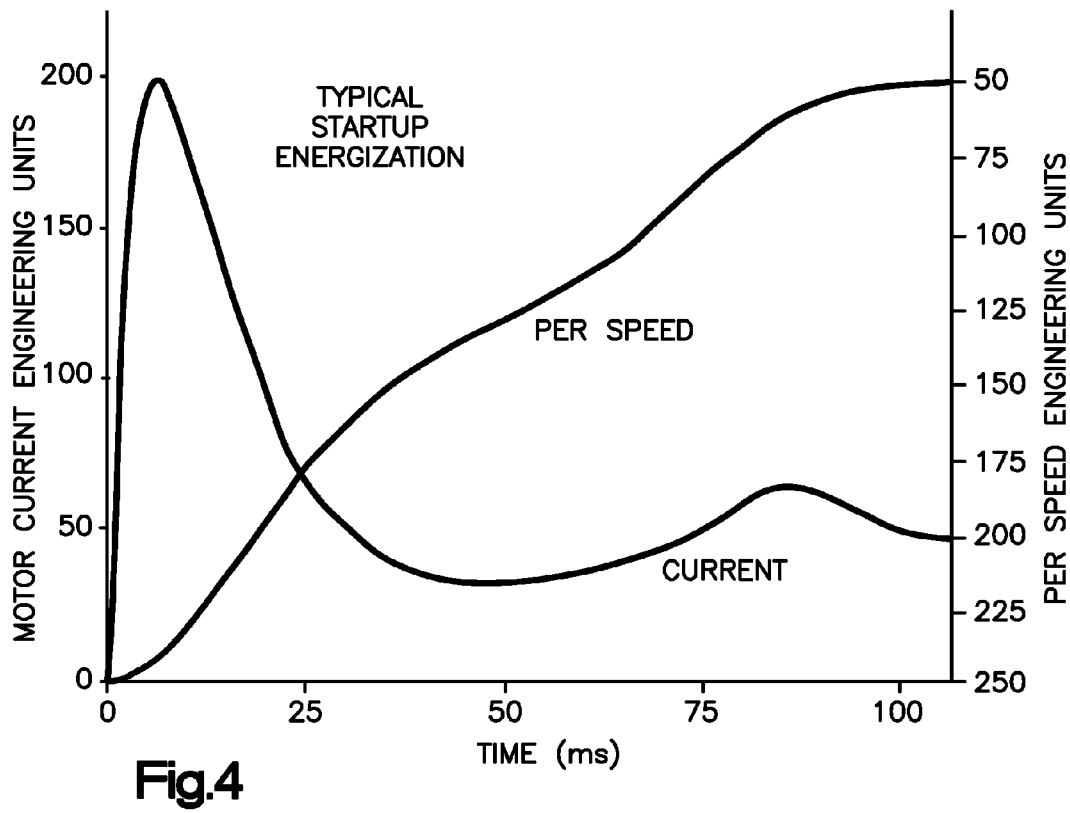
FIG. 4 represents typical startup energization characteristics of motor current and per speed versus time.

FIG. 4 shows typical startup energization characteristics of current and per speed for a motor. Startup obstacle detection is somewhat difficult because the characteristic startup current for a motor typically begins with a quick inductive rise toward a peak value primarily limited by the resistive impedance of the motor coil and speed starts from zero. Startup current peaks typically approach stalled rotor current of approximately four and one half to six times normal operating current. Starting currents peak quickly, approaching a typical maximum value of approximately 75% of stalled rotor condition, after which motor current gradually reduces to a steady state operating condition primarily due to increasing back EMF (electromotive force) generated by gradual increasing rotation speed of the rotor. Higher reference values for current sense scaling can be preferred for startup and stall conditions versus normal steady operation.

Relatively fast clock speeds of microcontroller circuitry enable fast detection of hard obstacles at startup by monitoring parameters of motor current and motor PP. Algorithms based upon monitored parameter values of motor voltage and motor current load, during a fixed startup time interval enable predicted anticipation of motor speed. If the sensed speed at the end of the fixed startup time interval is below a determined threshold, then an obstacle is determined. If the sensed current at the end of the fixed startup time interval is above a determined threshold, then an obstacle is determined.

Expressed in other terminology, after allowing some small initial amount of time for the motor rotor to begin rotation, I is immediately measured and compared against a fixed maximum threshold value and PP is immediately measured and compared against some maximum threshold number of clock cycles. If either measured parameter variable exceeds its fixed threshold value, then a hard obstacle detection is made and motor drive is immediately discontinued, and the actuation is briefly reversed to release the obstruction. The initial amount of time is that time during which a significant increase in motor speed is expected to be measurable. A larger motor and a motor with greater associated rotational inertia from the load will both typically require a longer acceleration time.

Hard Obstacle Detection Summary

In brief, hard obstacle detection is generally based upon adaptive algorithms that evaluate an immediate short history of motor current and speed of the immediate actuation. Hard obstacle detection is via fast processing algorithms of at least one FIFO memory containing sequential measurements of motor electrical current and per speed. Running calculations based upon the FIFO memory of measured values are stored in at least one FIFO memory. Hard obstacle detection after startup is performed via two algorithms. One algorithm method is based upon speed and rates of change of speed (also known as acceleration and deceleration) and/or rates of change of acceleration or deceleration (also known as jerk) to determine at least one value in excess of at least one limit. Another algorithm method is based upon measurements of motor current and derivatives thereof based upon time and/or position at times and/or positions determined at each motor commutation pulse and with further calculations based thereupon to determine at least one value in excess of at least one limit.

Hard obstacle threshold detection limits based upon motor current are also modified based upon the number of microcontroller pulses counted per motor current commutation pulse period. The condition of exceeding either one of these adaptive threshold limits is construed as hard obstacle detection. Implementation of this method is by utilization of at least one FIFO memory for storing such running measured values as PP and/or I, as previously defined. Additional FIFO memory can be used to store additional running calculated values based on PP and/or I. These running calculated values based upon time and/or position are of types including first derivative, second derivative, higher order derivative(s), weighted running averages, algebraic expressions, logarithms, statistical functions, and the like for computation of adaptive thresholds based thereupon.

Fast real time digital processing routines are simplified algebraic equations derived from piecewise linearization and/or other simplified algorithms for curve fitting of empirical sunroof panel operational data. Depending on accuracy requirements and relative algorithm processing speeds, higher order curve-fitting routines are anticipated. Hard obstacle detection occurs when either I and/or PP exceed a running adaptive threshold value comprised of terms based upon fixed, static, and/or dynamic values.

Soft Obstacle Detection Summary

In brief, soft obstacle detection is generally based upon adaptive algorithms that evaluate an immediate history of motor current and speed of the immediate actuation. The immediate history is much longer than that immediate short history per hard obstacle detection algorithms. Soft obstacle detection is also via fast processing algorithms of at least one FIFO memory containing sequential measurements of motor electrical current and per speed. Running calculations based upon the FIFO memory of measured values are stored in at least one FIFO memory. Soft obstacle detection after startup is performed via two algorithms. One algorithm method is based upon speed and rates of change of speed (deceleration) to determine at least one value in excess of at least one limit. Another algorithm method is based upon measurements of motor current and derivatives thereof based upon time and/or position at times and/or positions determined at each motor commutation pulse and with further calculations based thereupon to determine at least one value in excess of at least one limit.

Implementation of this unique method is by utilization of at least one FIFO memory for storing such running measured values as PP and/or I. Additional FIFO memory can be used to store additional running calculated values based on PP and/or I. These running calculated values based upon time and/or position are of types including first derivative, second derivative, higher order derivative(s), weighted running averages, algebraic expressions, logarithms, statistical functions, and the like for computation of adaptive thresholds based thereupon. Fast real time digital processing routines are simplified algebraic equations derived from piecewise linearization and/or other simplified algorithms for curve fitting of empirical sunroof panel operational data. Depending on accuracy requirements and relative algorithm processing speeds, higher order curve-fitting routines are anticipated. Soft obstacle detection occurs when either I and/or PP exceed a running adaptive threshold value comprised of terms based upon fixed, static, and/or dynamic values.

Software Digital Signal Processing Techniques

Algorithm methods generally used for data analysis can include time domain and/or frequency domain techniques. These data processing techniques include, but are not restricted to, algebraic manipulation, logical comparison, convolution, convolution integral, Fourier transforms, fast Fourier transforms, discrete Fourier transforms, z-transforms, wavelet analysis, and the like. Digital signal processing techniques and algorithms are used to monitor data from motor operation parameters and/or derived data thereof in practical real time to ascertain motor operation parameter changes characteristic of undesired obstacle loading.

Collision Detection Notation

Measured readings of hardware-filtered $I_n$ (motor current) and $PP_n$ (pulse period) are triggered by and thus synchronized with motor current commutation pulse detections. Multiple FIFOs (first-in-first-out memories) are utilized to store running measurements of $I_n$ and $PP_n$ as well as calculated values derived therefrom. In a very general sense, both hard obstruction detection and soft obstruction detection algorithms are based upon weighted factors of the history of running measurements and running calculations. Hard obstacle detection is biased more toward a relatively recent-term history, whereas soft obstacle detection is weighted more toward a relatively longer-term history.

Generalized obstacle detection is considered as an abbreviated subset from a very broad set of weighted factors based upon a running history of measured motor operation parameters and data calculations based thereupon for the immediate actuation operation. Prior methods of obstacle detection implement the method of predetermining an operation parameter template based upon some number of running weighted averages of sequential prior actuations. The present method uses no such predetermined operation parameter template, but rather calculates both hard and soft obstacle detection thresholds during the immediate actuator operation based upon at least one software algorithm.

Motor speed fractionally varies significantly more than does motor current with magnitude of motor supply voltage. Motor torque load correlates very well with motor current. Thus, motor current is the primary measured parameter of immediate importance for both hard and soft obstacle detection. Obstacle detection is desensitized to electronic noise by implementing a running software filter to calculate noise-reduced motor current for determination of obstacle detection. Obstacle detection is based upon measurements of motor current and motor speed per the following notations.

Processing equations, data, and variables utilize the following notations and definitions.

Subscript n represents pulse number, $n \geq 0$, where
n=0=most recent motor current commutation pulse
n=1=motor current commutation pulse just prior to n=0
n=2=motor current commutation pulse just prior to n=1.

Subscript m represents the identifier for motor operation term weighting factors, $m \geq 0$, where
Km=empirically determined term-weighting factors, alternatively adaptive.

Measured motor operation parameters, FIFO registers, where
$I_n$=measured motor current at the nth commutation pulse
PPn=counted number of clock cycles per pulse period between motor current commutation pulses from pulse n to (n+1).

Calculated motor operation values, FIFO registers, where
$I_{R0}$=calculated running software-filtered value of prior sequential measured motor currents in range zero
$I_{R1}$=calculated running software-filtered value of prior sequential measured motor currents in range one
$I_{Ra-f}$=calculated running software-filtered value of prior sequential measured motor currents in ranges a-f (a through f) . . . .
{Min $I_{Ra-f}$}=determined value of a minimum of motor current readings in prior sequential ranges a-f
{Max $I_{Ra-f}$}=determined value of a maximum of motor current readings in prior sequential ranges a-f
$PP_{R0}$=calculated running software-filtered value of prior sequential counted PP in range zero
$PP_{R1}$=calculated running software-filtered value of prior sequential counted PP in range one
$PP_{Ra-f}$=calculated running software-filtered value of prior sequential counted PP in ranges a-f Very recent motor operation parameter history is represented by at least one data set range given numeric identifier. Range zero includes data sets represented by the most recent sequential few motor current commutation pulses, typically 4 to 8 pulses. Range one includes data sets represented by a similar number of 4 to 8 motor current commutation pulses immediately prior to range zero. Although ranges zero and one typically represent data sets for 4 to 8 motor current commutation pulses each, the quantity of represented data sets can be as low as 1 and higher than 16, as determined by system operation requirements and monitored dynamic system conditions. Furthermore, the quantity of represented pulses per data set can be interactively modified in response to variations of measured motor operation parameters. The number of data sets in ranges one and two are empirically determined somewhat by the extent of software filtering necessary to adequately represent very recent history of motor operation parameters.

The quantity of such numeric identifier data ranges can be as low as 1 and higher than 8, depending upon actuator system dynamic response and fast filtration algorithm requirements. Furthermore, the quantity of data sets can be interactively modified in response to variations of measured motor operation parameters. Fast filtration requirements are determined by the electrical noise level, the number of motor current commutation pulses per motor revolution, the numbers of gear teeth in drive mechanisms, mechanical vibrations, and the like.

Longer recent motor operation parameter history is represented by at least one range given alphabetic identity. Range a, b, c, d, e, and f includes six data sets each represented by a significantly larger data set range than numeric identifier ranges zero and one. Although six ranges are here described, this quantity can be as low as one and higher than six, as determined by system operation requirements and monitored dynamic system conditions. Typically, each of the ranges a-f includes 8 to 24 data sets. Range a represents the most recent sequential motor current commutation pulses. Range b represents the similar-sized range immediately preceding range a. Likewise, up to range f. The number of data sets in ranges a-f can be as low as one and significantly higher than 24, depending upon slow filtration algorithm requirements. Furthermore, the number of data sets in each of ranges a-f, as well as the quantity of ranges, can be interactively modified in response to variations of measured motor operation parameters. Fast filtration requirements are determined by the electrical noise level, the number of motor current commutation pulses per motor revolution, the numbers of gear teeth in drive mechanisms, mechanical vibrations, frequency of periodic load disturbances, and the like.

Following examples will describe the use of two numeric identifier data set ranges zero and one, for very recent motor operation data, with each range representing data sets for six motor current commutation pulses. Following examples will also describe the use of six alphabetic identifier data set ranges a-f, for longer recent motor operation data, with each range representing data sets for 15 motor current commutation pulses.

In a simple preferred case, calculated running software-filtered algorithms determine even-weighted boxcar averages of sequential data from defined FIFO ranges, as follows.

For defined range zero, $n=x-1$ $I_{R0} \equiv 3 A_n I_n$ $n=0$ and $n=x-1$ $PP_{R0} \equiv 3 A_n PP_n.$ $n=0$ In this simple preferred example case, set $x=6$ and $A_n=(1/x)$ to produce evenly weighted boxcar averages from data representing six sequential motor current commutation pulse measurements. And likewise, $n=2x-1$ $I_{R1} \equiv 3 A_n I_n$ $n=x$ and $n=2x-1$ $PP_{R1} \equiv 3 A_n PP_n$ $n=x$ for range one.

In similar manner, evenly weighted boxcar averages are calculated from data in defined alphabetic ranges, as follows. By setting $y=15$ and $A_n=(1/y)$ and applying into equations $n=y-1$ $I_{Ra} \equiv 3 A_n I_n$ $n=0$ $n=2y-1$ $I_{Rb} \equiv 3 A_n I_n$ $n=y$ $n=3y-1$ $I_{Rc} \equiv 3 A_n I_n$ $n=2y$ $n=4y-1$ $I_{Rd} \equiv 3 A_n I_n$ $n=3y$ $n=5y-1$ $I_{Re} \equiv 3 A_n I_n$ $n=4y$ $n=6y-1$ $I_{Rf} \equiv 3 A_n I_n$ $n=5y$ and into equations $n=y-1$ $PP_{Ra} \equiv 3 A_n PP_n$ $n=0$ $n=2y-1$ $PP_{Rb} \equiv 3 A_n PP_n$ $n=y$ $n=3y-1$ $PP_{Rc}=3A_nPP_n$ $n=2y$ $n=4y-1$ $PP_{Rd}=3A_nPP_n$ $n=3y$ $n=5y-1$ $PP_{Re}=3A_nPP_n$ $n=4y$ $n=6y-1$ $PP_{Rf}=3A_nPP_n$ $n=5y$ These evenly weighted running software filtered averages are used to reveal calculated trends in larger recent motor operating parameter history.

For a system where algorithm processing must be very fast, the use of range sizes that are integer powers of the number 2, e.g. 1, 2, 4, 8, 16, 32, etc., result in boxcar averaging weighting factors that are very quickly multiplied by simply and quickly bit or nibble shifting the measured data.

In addition to running filtered shorter-term and longer-term averages of respective numeric range data and alphabetic range data it is necessary to compute dynamic noise levels of measured parameters to compensate obstacle detection thresholds for system noise. Increased relative noise levels necessitate increased obstacle detection thresholds to avoid false obstacle detection with subsequent stopping and reversal of the actuator. Such noise levels are computed from minimums and maximums determined by the following definitions.

$\{MinI_{Ra}\}$=minimum value of motor current readings in range a $\{MinI_{Rb}\}$=minimum value of motor current readings in range b $\{MinI_{Rc}\}$=minimum value of motor current readings in range c $\{MinI_{Rd}\}$=minimum value of motor current readings in range d $\{MinI_{Re}\}$=minimum value of motor current readings in range e $\{MinI_{Rf}\}$=minimum value of motor current readings in range f $\{MaxI_{Ra}\}$=maximum value of motor current readings in range a $\{MaxI_{Rb}\}$=maximum value of motor current readings in range b $\{MaxI_{Rc}\}$=maximum value of motor current readings in range c $\{MaxI_{Rd}\}$=maximum value of motor current readings in range d $\{MaxI_{Re}\}$=maximum value of motor current readings in range e $\{MaxI_{Rf}\}$=maximum value of motor current readings in range f Maximums and minimums from multiple alphabetic ranges are per these examples.

$\{MinI_{Rb-f}\}$=minimum value of motor current readings in ranges b-f $\{MaxI_{Rb-f}\}$=maximum value of motor current readings in ranges b-f Obstacle detection is based upon the history of minimum and maximum motor operation parameter measurements. The difference between the minimum and the maximum values gives an indication of the measured noise levels.

A very generic equation for obstacle detection includes above factors, shown below. Note that the term including the factor $I_{R0}$ is incorporated into the term on the left side and accommodated by suitable adjustment of remaining $K_n$ factors.

Hard and/or Soft Obstruction Detection

If $I_{R0} \geq [K_1 I_{Ra}]+[K_2 I_{Rb}]+[K_3 I_{Rc}]+[K_4 I_{Rd}]+[K_5 I_{Re}]+[K_6 I_{Rf}]+[K_7 PP_{Ra}]+[K_8 PP_{Rb}]+[K_9 PP_{Rc}]+[K_{10} PP_{Rd}]+[K_{11} PP_{Re}]+[K_{12} PP_{Rf}]+[K_{13} I_{R1}]+[K_{14}\{MinI_{Ra-f}\}]+[K_{15}\{MaxI_{Ra-f}\}]+[K_{16} PP_{R0}]+[K_{17} PP_{R1}]+K_8$ Then an Obstacle is Detected All of the above factors based upon I, PP, and calculated values thereof are preferred to be simple evenly weighted running averages and/or simple maximum and minimum comparisons that process relatively quickly. The large quantity of algebraic and logical operations precludes complete processing fast enough to quickly detect an obstruction and stop before pinch forces exceed safe limits.

Algorithm processing for hard and soft obstruction detection is divided into two separate equations, weighting the various terms depending upon magnitude of importance and processing time requirements. The following examples show generalized and preferred algorithms for hard and soft obstruction detection. $K_n$ factors are empirically determined to meet system dynamic performance mandates.

Hard Obstruction Detection

IF $I_{R0} \geq [K_1 I_{R1}]+[K_2 PP_{R1}]+K_3$

Then an Obstacle is Determined.

Hard obstruction detection is imperative to determine very quickly so this implementation keeps processing requirements to a low level, yet enables fast and reasonably precise hard obstacle detection. Large range average terms including current, pulse period, minimum current, and maximum current are all considered insignificant enough in the tradeoff against speed so they are removed. Small range average motor current, $I_{R0}$, is thus unitlessly compared with the sum of three terms $I_{R1}$, $PP_{R1}$, and $K_3$. This essentially compares immediate average current with immediately prior average current and immediately prior average pulse period plus an offset constant. Thus, a quick increase in sustained motor current tends toward hard obstruction determination. High values of pulse period indicate that the motor is running slow with high torque, so the difference between the actuator force and the maximum allowable pinch force is also low. Thus, high values of pulse period also tend toward hard obstruction determination.

Soft Obstruction Detection

IF $I_{R0} \geq [K_4 PP_{Rb-f}]+[K_5\{MinI_{Rb-f}\}]+[K_6\{MaxI_{Rb-f}\}]+K_7$

Then an Obstacle is Determined.

Soft obstruction detection is not nearly as time sensitive, as is hard obstruction detection, thus additional terms can be computed in the time allowed before the slow increase in entrapment force exceeds maximum allowable values. The large range average term for pulse period of ranges b-f provides a relatively stable representation of pulse period that relates inversely with speed. As speed is decreased, pulse period is increased. High values of PP indicate that the motor is running slow with high torque, so the difference between the actuator force and the maximum allowable pinch force is also low. Thus, high values of pulse period also tend toward hard obstruction determination. The large range minimum and maximum terms for motor current in ranges b-f are lumped together into two terms to provide a practical combination of terms representing both average current and current noise range. Dynamic loading conditions produce dynamic currents that result in a wider range of maximum, minimum, and maximum minus minimum current values. High values of current noise necessitate higher soft obstruction detection threshold values to avoid nuisance detection.

Depending upon the periodicity of motor loading conditions, it is possible to not only adapt thresholds reactively, but also to predictively adapt thresholds in anticipation of continued cyclic loading conditions. Software algorithms that evaluate various alphabetic range sizes of the FIFO data set to quantify max and min enable determination of alternating amplitudes characteristic of frequency and/or frequencies for which motor operation parameter loading reveals cyclic periodicity. Adaptive predictive compensation of soft obstacle detection enables improved sensitivity for set detection thresholds with reduced affect by cyclic dynamic loads such as wind buffeting or repetitive gear loading. The obstacle detection threshold is cyclically modified in anticipation of the regular disturbance detected. Such cyclic obstacle detection modification can occur simultaneously with dynamic transient response of obstacle detection threshold levels, as otherwise described.

Alternative Incremental Encoding Implementions

Sensorless electronic sensing of motor current commutation pulses is the preferred low cost method of motor rotor movement disclosed herein in fair detail. In certain circumstances, it may be preferable to use alternative absolute and/or incremental position sensing by at least one hardware sensor means. Such circumstances that might lead to the choice to implement position sensing via hardware sensors include: 1) desire to sense a greater number of encoder pulses per motor rotor revolution than produced by motor commutation segments to enable faster obstacle detection per time and/or per rotation; 2) high electrical noise environment that makes it difficult to maintain high accuracy of position count from electronic sensing of encoder pulses; 3) actuator mechanisms that potentially allow mechanical windup and/or jitter that mechanically feeds back to the motor rotor allowing production of rotor electronic pulses representing ostensible actuator motion and/or motion in the incorrect sense; and 4) systems for which it is desired to maintain strict position accuracy regardless of electrical noise and mechanical disturbances.

One particular general alternative preferred embodiment for incremental positioning sensing utilizes two sensing elements physically aligned to produce phase quadrature signals from a relatively moving target. Two sensing elements in phase quadrature orientation provide information about both speed and direction. A typical example of this implementation is to attach a diametrically magnetized (two pole) magnet to the rotor of a motor with two symmetrical bipolar latch Hall effect sensors held in 90 mechanical degrees and in proximity to sense the magnet. By this setup, there are two transitions per Hall effect sensor per pole pair, thus a total of four transitions per motor rotor revolution by which to trigger measurements of motor operation parameters as herein described with motor current commutation pulse sensing. Alternatively, use of a ring magnet having 10 pole pairs with similar symmetric bipolar latch Hall effect sensors in phase quadrature will produce 40 transitions per motor rotor revolution.

Various sensing properties utilized for incremental and/or absolute position sensing including optical, magnetic field, electric field, potentiometric, and the like. Magnetic fields are sensed by Hall effect, magnetoresistance, anisotropic magnetoresistance, giant magnetoresistance, collosal magnetoresistance, Wiegand effect, fluxgate magnetometry, magnetodiode, magnetotransistor, superconducting quantum interference magnetometry, and more. Electric fields are sensed by electrodes of fixed and/or variable geometry with sensitive electronic circuitry. Optical fields are sensed by photodiode, phototransistor, photoresistor, and thermocouple (for slowly changing fields converted to heat). Electromagnetic fields are sensed by electrodes as coupled antennas with tuned electronic circuitry.

Battery and Motor Protection

Battery voltage is monitored to determine when the power supply drops below some minimum value so the motor drive can be discontinued. This protects against battery rundown in the situation where a low voltage battery power supply is insufficient to drive the motor and/or sustained electrical load might pose a risk of draining the battery. A timeout timer to limit motor drive time is an additional preferred means by which similar protection is affected. Motor protection is optionally provided by such means as a current limiting diode, a positive temperature coefficient resistor, and/or a thermal cutout switch.

Ice Breaking

An alternative functional capability is an ice-breaking mode whereby full motor force is allowed for more than the minimum amount of time and/or distance to enable a window and/or sunroof panel to break loose from ice. This feature will be appreciated by many in cold climates who find their car windows and/or sunroofs stuck in position due to ice. For visibility and/or escape safety, this option is fully anticipated as a preferred functional feature. For this optional mode of operation, the controller remembers the starting position for safety reference and will not allow significant deviation therefrom if hard obstacle detection conditions are sustained. Under manual switched input control, the controller allows for alternating direction application of full motor force for some predetermined maximum distance and/or time, for example three millimeters and/or three seconds alternately in either direction before enabling hard obstacle detection capability. The characteristic current peak and then drop usually occurs over approximately 10 motor current commutation pulses, which corresponds to approximately 3 mm. IF startup current deviates significantly above normal AND IF the number of motor current commutation pulses deviates significantly below 10 during the usual amount of time for a typical startup characteristic, THEN the stall timeout timer can be increased up to perhaps 5 seconds to break ice by a simple algorithm based upon the two deviations. Thereafter, if normal actuator motion does not commence by breaking loose from the ice, the actuator can then be retracted to remove hard obstacle preload and the ice breaking cycle repeated. 3 mm is typically sufficient to break ice and also corresponds with the startup hard obstacle detection distance under conditions of obstacle preload. If the motor current remains high and the number of pulses is normal at the characteristic startup time, then a hard obstacle is determined. For safety considerations, this feature might be enabled only when the sensed ambient temperature is sufficiently cool to allow for the existence of ice conditions. Soft frozen ice might actually take a longer amount of time and/or distance to break free than hard frozen ice, there necessitating adjustment of the maximum set times and/or distances based on sensed temperature. An alternate method of breaking ice can be enabled with a switch press sequence. For example, two taps and hold, then the unit can go into manual mode which disables obstruction detection.

Timed Power Latch

An optional feature included in the preferred embodiment is for the controller to self latch power for an amount of time after the vehicle ignition is switched off, for example 15 seconds, to allow the vehicle operator to close the sunroof and/or windows. Likewise, another vehicle security alternative is to allow the operator to select the option for the vehicle sunroof and/or windows to automatically close when the ignition is switched OFF. This feature can work in conjunction with an alternative feature whereby the vehicle cabin temperature is sensed for the automatic function of opening the sunroof and/or the windows to the VENT position when the sensed vehicle cabin temperature exceeds some maximum set temperature. Similarly, a sunroof and/or window can automatically close to the fully closed position when the sensed vehicle cabin temperature is below some set temperature. A reasonable hysteresis between the vent set temperature and the cool close temperature will reduce unnecessary cycling between VENT and CLOSED positions.

Vehicle Communication Systems

Communication motor vehicle computer via the vehicle communication bus problem is optional based upon interface system capability and application requirements. Examples of vehicle communication buses include SAE (Society of Automotive Engineers) J1850, CAN (Controller Area Network), and numerous others developed by various automotive manufacturers. Such communication means can communicate actuator system fault conditions including faulty motor coil or commutator segment, low actuation speed, excessive motor current, drive mechanism range limitation, component failures, system failures, and the like.

This vehicle speed information might be obtained by vehicle bus multiplexing (MUX) communication and/or demultiplexing (DEMUX) communication from such sources as speedometer, transmission, and transfer case as is used by other sources such as cruise control system, anti-skid braking system, and traction control system. Similarly, information from the vehicle environmental control systems might provide information such as fan speeds and ventilation settings that can be of value to anticipate an amount of static and transient loading on the sunroof and windows. Utilization of a relatively fast responding pressure sensor enables empirically-correlative predictive modification of obstacle detection thresholds to overcome variable changes of actuator load due to static, periodic dynamic, and transient dynamic vehicle cabin atmospheric pressures. An optional anticipated feature is for the vehicle sunroof position to be automatically moved to a position to reduce sensed cabin wind buffeting and/or noise.

Empirical Actuation Motor Load Profile Equation and Algorithm

Nominal operation parameters for obstacle detection threshold are empirically characterized as motor current loading versus actuator position. Alternative empirical characterizations include motor current versus time, motor speed versus time, motor speed versus position, and combinations thereof as per prior art references. In the present embodiment, this algebraic representation has a general simplified algebraic form for fast computation via DSP processing, particularly implementing adding and/or bit shifting and/or byte shifting operations. These types of empirical data manipulations for conversion to fast computing real time microcontroller algorithms have been found to be applicable to various diverse combinations of vehicles and sunroofs.

To accommodate each vehicle's fixed aerodynamic profile, it is typically necessary to empirically determine and characterize each type of vehicle with each type of sunroof for each direction of opening and/or closing over a wide range of vehicle speed and temperature conditions to determine all appropriate adaptive obstacle detection threshold calculation algorithms.

The present invention provides a system wherein empirical data representing a range of operational conditions and empirically determined functional terms and factors for an automatic powered actuator can be converted by simplified piecewise line and/or curve fitting means to algorithmic equations with coefficients that support fast real time processing such that adaptive sensing thresholds are enabled resulting in improved sensitivity, improved accuracy, and improved time response to obstruction conditions. Based upon the complexity of the actuation system, sensitivity requirements, and time response requirements, additional refinements as threshold error reducing terms can be characterized for inclusion into the sensing threshold equation using similar methods.

Utilization of simplified equations in the processing algorithms allows for fast performance in real time without relying upon previous methods such as using fixed characteristic signature templates and/or slowing down actuator motor drive speed.

Alternative Applications

When used to operate a power sunroof the control circuit can open the sunroof, close the sunroof, and tilt open the sunroof to a vent position. The preferred embodiment of the invention automatically controls a power sunroof but similar actuation of other automatic powered panels or windows is anticipated using the disclosed control circuit and obstruction detection methods.

Load sensing threshold determinations via similar methods to this teaching are anticipated for alternative application functions including those without human involvement and for applications without potential for equipment damage. It is fully anticipated and expected that systems and methods can well be similarly utilized to control practically any system variable by monitoring at least one operational parameter such that the controlled variable is not required to be safety related. This method and system, based on empirical determinations of operating parameters, running measurements of operating parameters, FIFO memories for storing measured and/or calculated values, fast computation algorithms, and subjective determination of load threshold parameter values can generally be applied to systems and devices where such variable thresholds are chosen for functional means other than for purposes of human safety or equipment protection. The large scope includes systems having more than one such controlled variable.

Aeronautical systems have applicability of the inventive disclosure. An example is the detection of the onset of stall conditions by the change in force and/or a cyclical varying lift produced by an airfoil as it is increasingly approaching a stall condition. Such impending stall condition is the sensed input, instead of obstacle detection, that precedes the control response to outputs including engine power, flap actuation, elevator actuation, aileron actuation, rudder actuation, ice boot actuation, and the like. Analogously, hydraulic liquid flow control systems for ships and submarines are anticipated.

Hydraulic, pneumatic, and mechanical systems are similarly anticipated by computations based upon time, position, and/or other derivatives of monitored parameters including:

position, pressure, volume, flow, force, torque and the like. Utilization of analogous algorithms and adaptive methods and systems enables obstacle detection, and/or arbitrary functional limit detections Broad Encompassed Alternatives While the present invention has been described with a degree of particularity, it is the full intent that the invention include modifications and altercations from the disclosed and anticipated designs falling within the spirit and/or scope of the appended claims.

The invention claimed is:

1. Apparatus for controlling activation of a motor coupled to a motor vehicle window or panel for moving said window or panel along a travel path and de-activating the motor if an obstacle is encountered by the window or panel, said apparatus comprising:
   a) a sensor for sensing movement of the window or panel and providing a sensor output signal related to a speed of movement of the window or panel;
   b) a switch for controllably actuating the motor by providing an energization signal;
   c) one or more switches for use by the controller to determine window or panel position; and
   d) a controller having an interface coupled to the sensor and the switch for controllably energizing the motor; said controller sensing a collision with an obstruction when power is applied to the controller by:
      i) monitoring movement of the window or panel by monitoring a signal from the sensor related to the movement of the window or panel;
      ii) adjusting an obstacle detection threshold in real time based on immediate past measurements of the signal sensed by the sensor to adapt to varying conditions encountered during operation of the window or panel;
      iii) identifying a collision of the window or panel with an obstacle due to a change in the signal from the sensor that is related to a change in movement of the window or panel by comparing a value based on a most recent signal from the sensor with the obstacle detection threshold; and
      iv) outputting a control signal to said switch to deactivate said motor in response to a sensing of a collision between an obstacle and said window or panel.

2. The apparatus of claim 1 wherein the controller comprises a programmable controller including a processing unit for executing a control program and including a memory for storing multiple window or panel speed values corresponding to a signal received from the sensor.

3. The apparatus of claim 1 wherein the controller maintains a position of a leading edge of the window or panel and further wherein the controller reverse energizes the motor to move the window or panel away from a closure position prior to activating the motor to close the window or panel.

4. The apparatus of claim 3 wherein the controller reverse energizes the motor in response to a sensing of an obstacle and the reverse energizing and attempt to move the window or panel to a closed position is performed to confirm sensing of the obstacle.

5. The apparatus of claim 1 wherein the immediate past measurements of said signal are sensed within a forty millisecond interval prior to the most recent signal from the sensor.

6. Apparatus for controlling activation of a motor coupled to a motor vehicle window or panel for moving said window or panel along a travel path and de-activating the motor when movement of the window or panel is stopped prior to reaching a predetermined position, said apparatus comprising:
   a) a sensor for sensing movement of the window or panel and providing a sensor output signal related to a position of the window or panel;
   b) a switch for controllably actuating the motor by providing an energization signal; and
   c) a controller having an interface coupled to the sensor and the switch for controllably energizing the motor; said controller programmed with multiple position limits that define an acceptable travel range and further programmed for controlling movement of the window or panel when power is applied to the controller by:
      i) monitoring the sensor output signal from the sensor related to the position of the window or panel;
      ii) identifying the position of the window or panel based on the sensor output signal from the sensor; and
      iii) outputting a control signal to said switch to deactivate said motor in response to a sensing said window or panel has stopped moving prior to reaching a position limit.

7. The apparatus of claim 6 wherein the controller comprises a programmable controller including a processing unit for executing a control program and including a memory for storing multiple window or panel position values corresponding to a signal received from the sensor.

8. The apparatus of claim 6 additionally comprising one or more position limits programmed for use by the controller to determine window or panel position for use in identifying whether the window or panel is closed or open.

9. The apparatus of claim 6 wherein the controller maintains a position of a leading edge of the window or panel and further wherein the controller reverse energizes the motor to move the window or panel away from a closure position prior to activating the motor to close the window or panel.

10. The apparatus of claim 6 wherein the controller includes an interface for monitoring user actuation of control inputs for controlling movement of the motor vehicle window or panel and wherein the controller maintain a position indication which is updated in response to movement of the window or panel and further wherein the controller reverse actuates the motor near an end point in the travel path of the window or panel to avoid false obstacle detection in a region of closure of the window or panel.

* * * * *